(12) United States Patent
Sasaki et al.

(10) Patent No.: US 9,236,082 B2
(45) Date of Patent: Jan. 12, 2016

(54) NEAR-FIELD LIGHT GENERATOR INCLUDING A WAVEGUIDE AND A PLASMON GENERATOR

(71) Applicants: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Hideo Mamiya, Milpitas, CA (US); Ryuji Fujii, Hong Kong (CN)

(72) Inventors: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Hideo Mamiya, Milpitas, CA (US); Ryuji Fujii, Hong Kong (CN)

(73) Assignees: HEADWAY TECHNOLOGIES, INC., Milpitas, CA (US); SAE MAGNETICS (H.K.) LTD., Hong Kong (CN)

( * ) Notice: Subject to any disclaimer, the term of this patent is extended or adjusted under 35 U.S.C. 154(b) by 103 days.

(21) Appl. No.: 14/069,883

(22) Filed: Nov. 1, 2013

(65) Prior Publication Data

US 2015/0124575 A1    May 7, 2015

(51) Int. Cl.
*G11B 5/48*    (2006.01)
*G02B 6/42*    (2006.01)
*G02B 6/136*    (2006.01)
*G11B 9/12*    (2006.01)
*G02B 6/122*    (2006.01)
*G11B 5/31*    (2006.01)
(Continued)

(52) U.S. Cl.
CPC ............ *G11B 9/12* (2013.01); *G02B 6/1226* (2013.01); *G11B 5/314* (2013.01); *G11B 5/3133* (2013.01); *G11B 5/4866* (2013.01); *G11B 7/24059* (2013.01); *G02B 6/12004* (2013.01); *G02B 6/136* (2013.01); *G02B 6/4291* (2013.01); *G11B 2005/0021* (2013.01); *Y10T 29/49* (2015.01)

(58) Field of Classification Search
CPC ............ G11B 2005/0021; G11B 5/314; G11B 5/127; G11B 5/147; G11B 7/1387; G11B 7/24059; G11B 9/12; G11B 11/24; G11B 13/08; G11B 5/1272; G11B 5/1274; G11B 5/1276; G11B 5/1278; G11B 2005/001; G11B 5/3116; G11B 5/3163; G11B 5/4866; G11B 5/6088; G02B 6/1226; G02B 6/12004; G02B 6/136; G02B 6/4291; Y10T 29/49; Y10T 29/49032
USPC .......... 369/13.33, 13.13, 13.12–13.14, 13.17, 369/13.24, 13.34, 14, 15, 112.14, 112.21, 369/112.27, 300; 360/114.02, 360/123.02–123.24, 125.74, 59
See application file for complete search history.

(56) References Cited

U.S. PATENT DOCUMENTS

2009/0168220 A1*    7/2009    Komura ................ G11B 5/314
360/59

(Continued)

OTHER PUBLICATIONS

U.S. Appl. No. 13/777,488, filed Feb. 26, 2013 in the name of Yoshitaka Sasaki et al.

*Primary Examiner* — Dionne H Pendleton
(74) *Attorney, Agent, or Firm* — Oliff PLC

(57) ABSTRACT

A plasmon generator includes a first portion and a second portion that are adjacent in a first direction orthogonal to the direction of travel of light propagating through a core. The second portion includes a front end face located in a medium facing surface of a magnetic head. The core has a concave portion recessed from the top surface of the core. At least part of the first portion is received in the concave portion. The concave portion has a surface including an evanescent light generating portion. The first portion includes a plasmon exciting portion opposed to the evanescent light generating portion. The evanescent light generating portion is inclined relative to a first surface.

19 Claims, 12 Drawing Sheets

(51) Int. Cl.
  *G11B 7/24059* (2013.01)
  *G11B 5/00* (2006.01)
  *G02B 6/12* (2006.01)

(56) References Cited

U.S. PATENT DOCUMENTS

2010/0172220 A1* 7/2010 Komura ................ B82Y 10/00 369/13.33
2011/0170381 A1 7/2011 Matsumoto
2014/0133283 A1* 5/2014 Maletzky ............... G11B 5/314 369/13.33
2014/0269233 A1* 9/2014 Hara ...................... G11B 5/314 369/13.17
2015/0085629 A1* 3/2015 Sasaki .................. G02B 6/1226 369/13.33

* cited by examiner

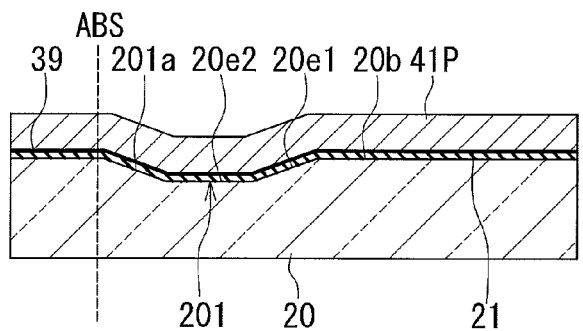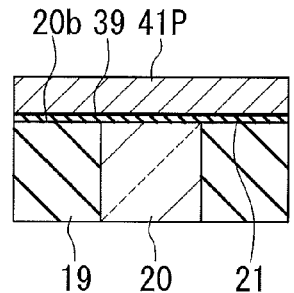
FIG. 7A    FIG. 7B
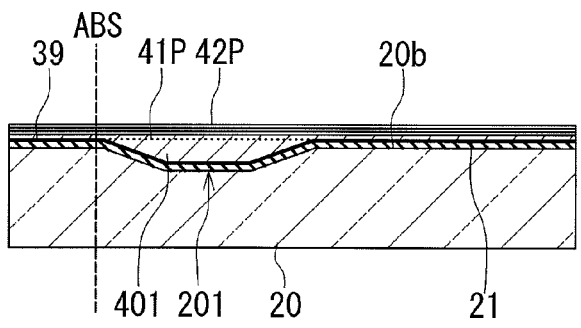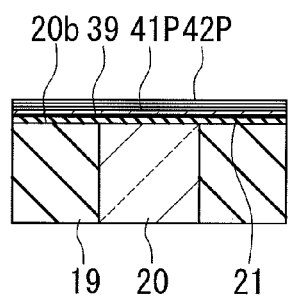
FIG. 8A    FIG. 8B
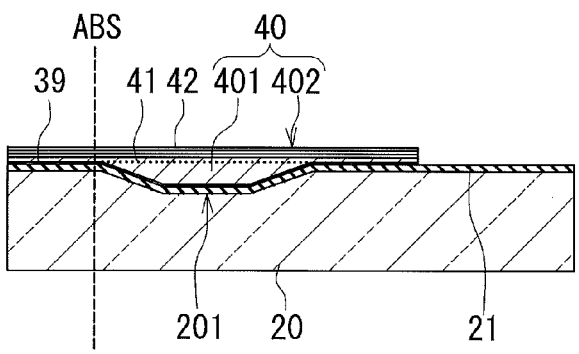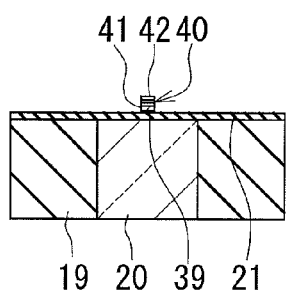
FIG. 9A    FIG. 9B

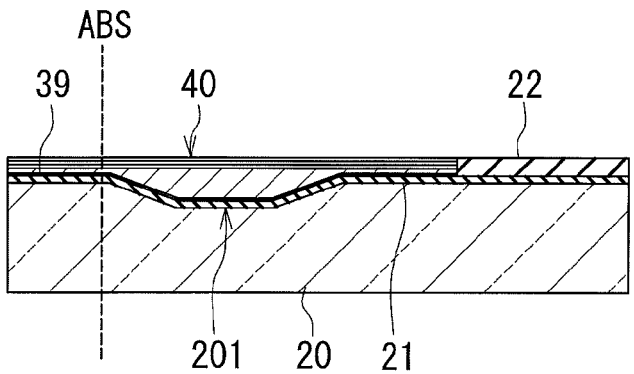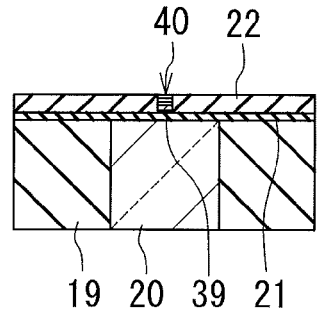
FIG. 10A  FIG. 10B
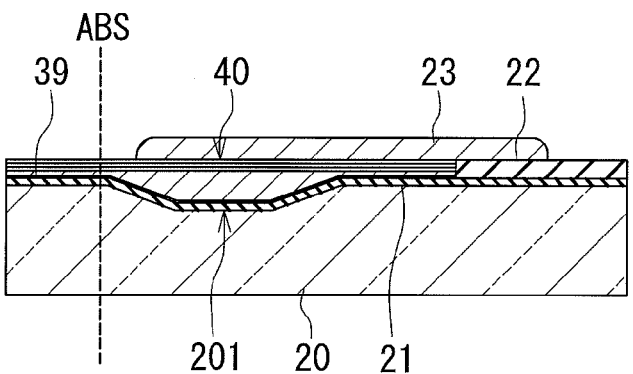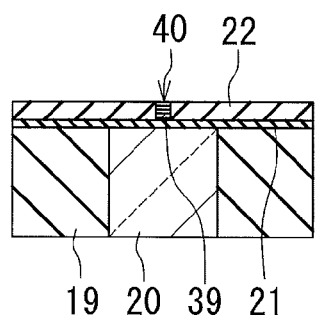
FIG. 11A  FIG. 11B
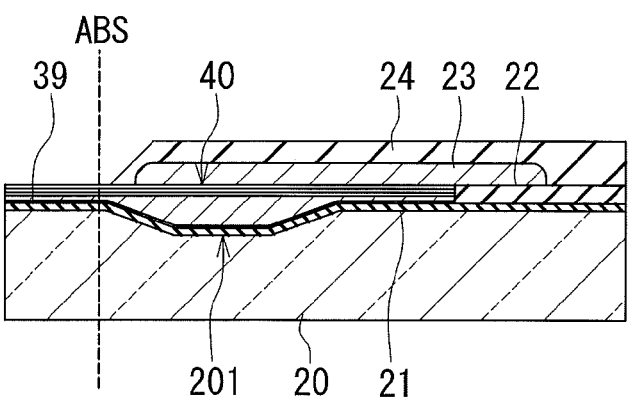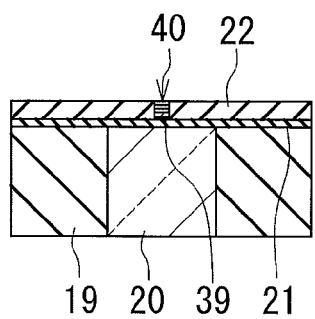
FIG. 12A  FIG. 12B

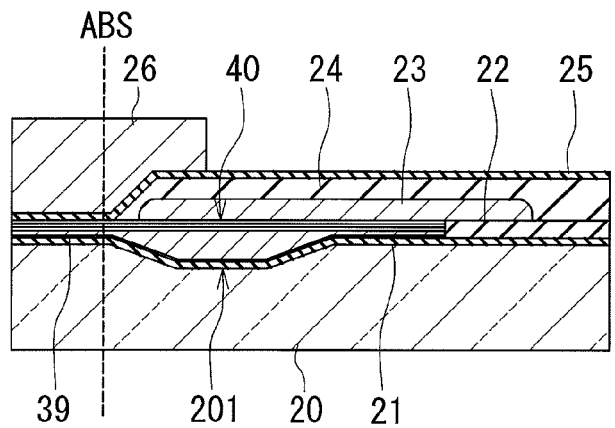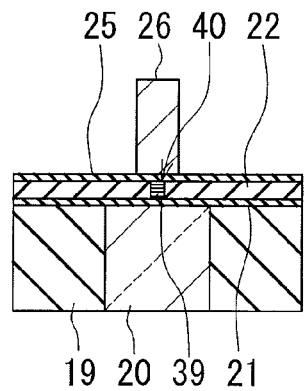
FIG. 13A    FIG. 13B
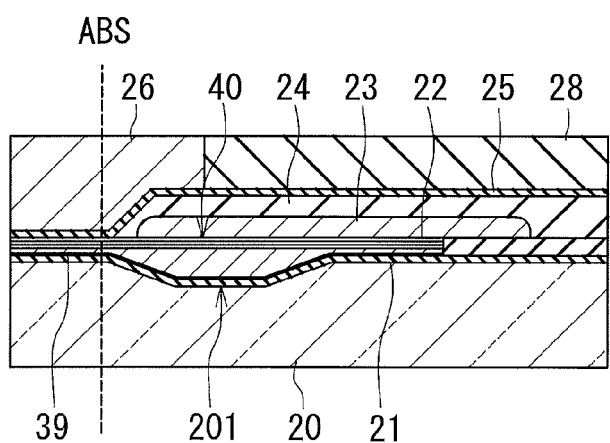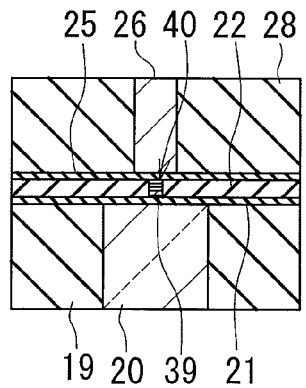
FIG. 14A    FIG. 14B

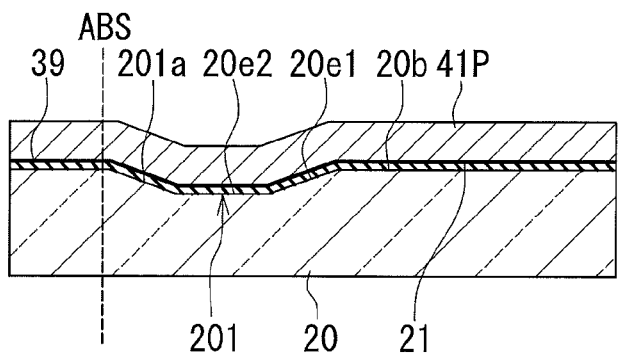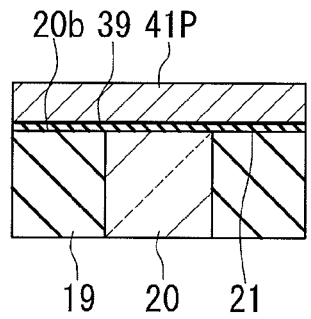
FIG. 19A   FIG. 19B
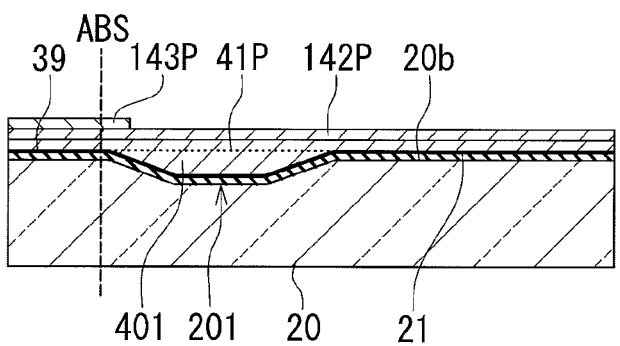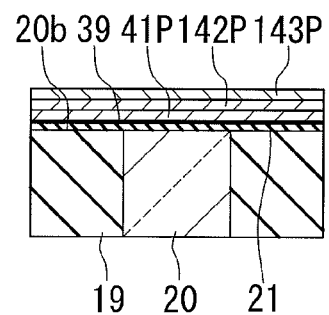
FIG. 20A   FIG. 20B
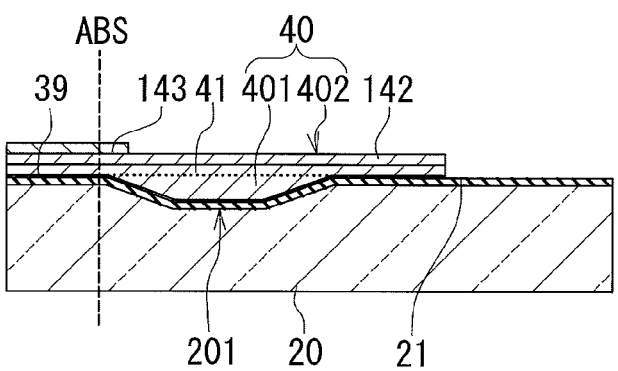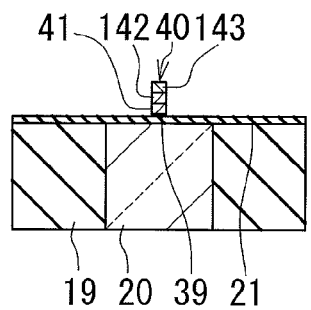
FIG. 21A   FIG. 21B

NEAR-FIELD LIGHT GENERATOR INCLUDING A WAVEGUIDE AND A PLASMON GENERATOR

BACKGROUND OF THE INVENTION

1. Field of the Invention

The present invention relates to a near-field light generator for use in thermally-assisted magnetic recording in which a recording medium is irradiated with near-field light to lower the coercivity of the recording medium for data writing, and to a thermally-assisted magnetic recording head including the near-field light generator.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider that flies slightly above the surface of a recording medium. The slider has a medium facing surface facing the recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

The plasmon generator has a front end face located in the medium facing surface. The front end face generates near-field light. Surface plasmons are excited on the plasmon generator and propagate along the surface of the plasmon generator to reach the front end face. As a result, the surface plasmons concentrate at the front end face, and near-field light is generated from the front end face based on the surface plasmons.

U.S. Patent Application Publication No. 2011/0170381 A1 discloses a thermally-assisted magnetic recording head in which a surface of a waveguide and a surface of a metallic structure (plasmon generator) are arranged to face each other with a gap therebetween. In this thermally-assisted magnetic recording head, evanescent light that occurs at the surface of the waveguide based on light propagating through the waveguide is used to excite surface plasmons on the metallic structure, and near-field light is generated based on the excited surface plasmons. Further, U.S. Patent Application Publication No. 2011/0170381 A1 discloses forming a part of the metallic structure from a material different from that of other parts of the metallic structure.

Materials that are typically employed for plasmon generators are metals having high electrical conductivities, such as Au and Ag. However, Au and Ag are relatively soft and have relatively high thermal expansion coefficients. Thus, forming an entire plasmon generator of Au or Ag gives rise to problems as discussed below.

In the process of manufacturing a thermally-assisted magnetic recording head, the medium facing surface is formed by polishing. During polishing, polishing residues of metal materials may grow to cause smears. To remove the smears, the polished surface is slightly etched by, for example, ion beam etching in some cases. If an entire plasmon generator is formed of Au or Ag, which are relatively soft, the polishing and etching mentioned above may cause the front end face of the plasmon generator to be significantly recessed relative to the other parts of the medium facing surface. In such a case, the front end face of the plasmon generator becomes distant from the recording medium, and the heating performance of the plasmon generator is thus degraded.

Part of the energy of light guided to the plasmon generator through the waveguide is transformed into heat in the plasmon generator. Part of the energy of near-field light generated by the plasmon generator is also transformed into heat in the plasmon generator. The plasmon generator thus rises in temperature during the operation of the thermally-assisted magnetic recording head. If the entire plasmon generator is formed of Au or Ag, the rise in temperature of the plasmon generator causes the plasmon generator to expand and significantly protrude toward the recording medium. This in turn may cause a protective film covering the medium facing surface to come into contact with the recording medium and thereby damage the recording medium or be broken. When the protective film is broken, the plasmon generator may be damaged by contact with the recording medium or may be corroded by contact with high temperature air.

Further, if the entire plasmon generator is formed of Au or Ag, the temperature rise of the plasmon generator may result in deformation of the plasmon generator due to aggregation. In addition, such a plasmon generator expands when its temperature rises and then contracts when its temperature drops. When the plasmon generator undergoes such a process, the front end face of the plasmon generator may be significantly recessed relative to the other parts of the medium facing surface. In such a case, the heating performance of the plasmon generator is degraded as mentioned above.

For the various reasons described above, a plasmon generator that is formed entirely of Au or Ag has the drawback of being low in reliability. The drawback becomes more noticeable if the front end face of the plasmon generator is large in area.

U.S. Patent Application Publication No. 2011/0170381 A1 discloses a metallic structure composed of a main body and a layer having a greater hardness than the main body (this layer will hereinafter be referred to as the hard layer). In the metallic structure, the main body is not exposed in the medium facing surface, but the hard layer is exposed in the medium facing surface. In the metallic structure, surface plasmons are generated in the main body. The generated surface plasmons propagate to the hard layer, and near-field light is generated from the vertex of the hard layer.

In the thermally-assisted magnetic recording head disclosed in U.S. Patent Application Publication No. 2011/0170381 A1, the surface of the waveguide that generates evanescent light and the surface of the metallic structure facing the aforementioned surface of the waveguide are both arranged parallel to the direction of travel of the light propagating through the waveguide. This configuration allows only a small amount of the entire light propagating through the waveguide to reach the evanescent light generating surface of the waveguide. It is thus difficult with this configuration to generate much evanescent light and to thereby excite a lot of surface plasmons on the plasmon generator.

OBJECT AND SUMMARY OF THE INVENTION

It is an object of the present invention to provide a near-field light generator including a waveguide and a plasmon generator, the near-field light generator allowing for excitation of a lot of surface plasmons on the plasmon generator and allowing the plasmon generator to operate with high reliability, and to provide a thermally-assisted magnetic recording head including such a near-field light generator.

A near-field light generator of the present invention includes a waveguide and a plasmon generator. The waveguide includes a core through which light propagates, and a cladding provided around the core. The plasmon generator has a front end face.

The plasmon generator includes a first portion and a second portion that are adjacent in a first direction orthogonal to the direction of travel of the light propagating through the core. The second portion includes the front end face. The core has a first surface intersecting the first direction and a concave portion recessed from the first surface. At least part of the first portion of the plasmon generator is received in the concave portion.

The concave portion of the core has a surface contiguous with the first surface. The surface of the concave portion includes a first evanescent light generating portion that is located farther from a virtual plane than is the first portion of the plasmon generator, the virtual plane including the front end face of the plasmon generator. The first portion of the plasmon generator includes a first plasmon exciting portion opposed to the first evanescent light generating portion. The first evanescent light generating portion has a first edge closest to the first surface and a second edge farthest from the first surface. The distance from the virtual plane to an arbitrary point on the first evanescent light generating portion decreases with decreasing distance from the arbitrary point to the second edge.

The first evanescent light generating portion generates first evanescent light based on the light propagating through the core. A first surface plasmon is excited on the first plasmon exciting portion through coupling with the first evanescent light. The front end face of the plasmon generator generates near-field light based on the first surface plasmon.

In the near-field light generator of the present invention, the first evanescent light generating portion may form an angle in the range of 55° to 80° relative to the first direction.

In the near-field light generator of the present invention, the surface of the concave portion of the core may further include a second evanescent light generating portion that is located closer to the virtual plane than is the first evanescent light generating portion and contiguous with the first evanescent light generating portion. In this case, the first portion of the plasmon generator may further include a second plasmon exciting portion opposed to the second evanescent light generating portion. The second evanescent light generating portion and the second plasmon exciting portion are adjacent in the first direction. The second evanescent light generating portion generates second evanescent light based on the light propagating through the core. A second surface plasmon is excited on the second plasmon exciting portion through coupling with the second evanescent light. The front end face of the plasmon generator generates near-field light based on the first and second surface plasmons.

The first surface of the core may include a third evanescent light generating portion that is located farther from the virtual plane than is the first evanescent light generating portion and contiguous with the first evanescent light generating portion. In this case, the second portion of the plasmon generator may include a third plasmon exciting portion opposed to the third evanescent light generating portion. The third evanescent light generating portion generates third evanescent light based on the light propagating through the core. A third surface plasmon is excited on the third plasmon exciting portion through coupling with the third evanescent light. The front end face of the plasmon generator generates near-field light based on the first to third surface plasmons.

A method of manufacturing the near-field light generator of the present invention includes the steps of forming the core, forming the cladding, and forming the plasmon generator. The step of forming the core includes the step of forming an initial core having a top surface, and the step of forming the concave portion in the initial core by etching a portion of the top surface of the initial core. The initial core becomes the core when the concave portion is formed. In the step of forming the concave portion, the remaining unetched portion of the top surface of the initial core becomes the first surface of the core. In the step of forming the plasmon generator, the plasmon generator is formed such that at least part of the first portion is received in the concave portion.

In the method of manufacturing the near-field light generator of the present invention, the second portion of the plasmon generator may include a first metal layer, a second metal layer, and an intermediate layer. The intermediate layer is interposed between the first metal layer and the second metal layer. Each of the first metal layer, the second metal layer and the intermediate layer has an end located in the front end face. Each of the first and second metal layers is formed of a metal material. The intermediate layer is formed of a material that is higher in Vickers hardness than the metal material used to form the first metal layer and the metal material used to form the second metal layer. In this case, the step of forming the plasmon generator includes the step of forming the first portion and the step of forming the second portion after the step of forming the first portion.

In the method of manufacturing the near-field light generator of the present invention, the first portion of the plasmon generator may be formed of a first metal material, and the second portion of the plasmon generator may include a second metal material portion formed of a second metal material, and a third metal material portion formed of a third metal material. The second metal material portion is located closer to the first portion than is the third metal material portion. The first and second metal materials are higher in electrical conductivity than the third metal material. The third metal material is higher in Vickers hardness than the first and second metal materials. In this case, the step of forming the plasmon generator includes the step of forming the first portion and the step of forming the second portion after the step of forming the first portion.

A thermally-assisted magnetic recording head of the present invention includes a medium facing surface facing a recording medium, a main pole producing a write magnetic field for writing data on the recording medium, and a near-field light generator. The near-field light generator includes a wave guide and a plasmon generator. The wave guide includes a core through which light propagates, and a cladding provided around the core. The plasmon generator has a front end face located in the medium facing surface.

The plasmon generator includes a first portion and a second portion that are adjacent in a first direction orthogonal to the direction of travel of the light propagating through the core. The second portion includes the front end face. The core has a first surface intersecting the first direction, and a concave portion recessed from the first surface. At least part of the first portion of the plasmon generator is received in the concave portion.

The concave portion of the core has a surface contiguous with the first surface. The surface of the concave portion includes a first evanescent light generating portion that is located farther from the medium facing surface than is the first portion of the plasmon generator. The first portion of the plasmon generator includes a first plasmon exciting portion opposed to the first evanescent light generating portion. The first evanescent light generating portion has a first edge closest to the first surface and a second edge farthest from the first surface. The distance from the medium facing surface to an arbitrary point on the first evanescent light generating portion decreases with decreasing distance from the arbitrary point to the second edge.

The first evanescent light generating portion generates first evanescent light based on the light propagating through the core. A first surface plasmon is excited on the first plasmon exciting portion through coupling with the first evanescent light. The front end face of the plasmon generator generates near-field light based on the first surface plasmon.

In the thermally-assisted magnetic recording head of the present invention, the first evanescent light generating portion may form an angle in the range of 55° to 80° relative to the first direction.

In the thermally-assisted magnetic recording head of the present invention, the surface of the concave portion of the core may further include a second evanescent light generating portion that is located closer to the medium facing surface than is the first evanescent light generating portion and contiguous with the first evanescent light generating portion. In this case, the first portion of the plasmon generator may further include a second plasmon exciting portion opposed to the second evanescent light generating portion. The second evanescent light generating portion and the second plasmon exciting portion are adjacent in the first direction. The second evanescent light generating portion generates second evanescent light based on the light propagating through the core. A second surface plasmon is excited on the second plasmon exciting portion through coupling with the second evanescent light. The front end face of the plasmon generator generates near-field light based on the first and second surface plasmons.

The first surface of the core may include a third evanescent light generating portion that is located farther from the medium facing surface than is the first evanescent light generating portion and contiguous with the first evanescent light generating portion. In this case, the second portion of the plasmon generator may include a third plasmon exciting portion opposed to the third evanescent light generating portion. The third evanescent light generating portion generates third evanescent light based on the light propagating through the core. A third surface plasmon is excited on the third plasmon exciting portion through coupling with the third evanescent light. The front end face of the plasmon generator generates near-field light based on the first to third surface plasmons.

In the near-field light generator and the thermally-assisted magnetic recording head of the present invention, the second portion of the plasmon generator may include a first metal layer, a second metal layer, and an intermediate layer. The intermediate layer is interposed between the first metal layer and the second metal layer. Each of the first metal layer, the second metal layer and the intermediate layer has an end located in the front end face. Each of the first and second metal layers is formed of a metal material. The intermediate layer is formed of a material that is higher in Vickers hardness than the metal material used to form the first metal layer and the metal material used to form the second metal layer.

In the near-field light generator and the thermally-assisted magnetic recording head of the present invention, the first portion of the plasmon generator may be formed of a first metal material, and the second portion of the plasmon generator may include a second metal material portion formed of a second metal material, and a third metal material portion formed of a third metal material. The second metal material portion is located closer to the first portion than is the third metal material portion. The first and second metal materials are higher in electrical conductivity than the third metal material. The third metal material is higher in Vickers hardness than the first and second metal materials.

In the present invention, the plasmon generator includes the first portion and the second portion. The second portion includes the front end face. The first portion includes the first plasmon exciting portion. These features make it possible to excite a lot of surface plasmons on the plasmon generator without necessitating an increase in the area of the front end face of the plasmon generator.

Further, in the present invention, at least part of the first portion of the plasmon generator is received in the concave portion of the core. The surface of the concave portion includes the first evanescent light generating portion. The first plasmon exciting portion is opposed to the first evanescent light generating portion. The first evanescent light generating portion has the first edge closest to the first surface of the core and the second edge farthest from the first surface of the core. The distance from the aforementioned virtual plane to an arbitrary point on the first evanescent light generating portion decreases with decreasing distance from the arbitrary point to the second edge. These features allow the first evanescent light generating portion to generate much first evanescent light and thereby make it possible to excite a lot of first surface plasmons on the first plasmon exciting portion.

Consequently, the present invention makes it possible to provide a near-field light generator that allows for excitation of a lot of surface plasmons on a plasmon generator and allows the plasmon generator to operate with high reliability, and to provide a thermally-assisted magnetic recording head including such a near-field light generator.

Other and further objects, features and advantages of the present invention will appear more fully from the following description.

BRIEF DESCRIPTION OF THE DRAWINGS

FIG. 7A and FIG. 7B are cross-sectional views showing a step of a method of manufacturing the thermally-assisted magnetic recording head according to the first embodiment of the invention.

FIG. 8A and FIG. 8B are cross-sectional views showing a step that follows the step shown in FIG. 7A and FIG. 7B.

FIG. 9A and FIG. 9B are cross-sectional views showing a step that follows the step shown in FIG. 8A and FIG. 8B.

FIG. 10A and FIG. 10B are cross-sectional views showing a step that follows the step shown in FIG. 9A and FIG. 9B.

FIG. 11A and FIG. 11B are cross-sectional views showing a step that follows the step shown in FIG. 10A and FIG. 10B.

FIG. 12A and FIG. 12B are cross-sectional views showing a step that follows the step shown in FIG. 11A and FIG. 11B.

FIG. 13A and FIG. 13B are cross-sectional views showing a step that follows the step shown in FIG. 12A and FIG. 12B.

FIG. 14A and FIG. 14B are cross-sectional views showing a step that follows the step shown in FIG. 13A and FIG. 13B.

FIG. 19A and FIG. 19B are cross-sectional views showing a step of a method of manufacturing the thermally-assisted magnetic recording head according to the second embodiment of the invention.

FIG. 20A and FIG. 20B are cross-sectional views showing a step that follows the step shown in FIG. 19A and FIG. 19B.

FIG. 21A and FIG. 21B are cross-sectional views showing a step that follows the step shown in FIG. 20A and FIG. 20B.

DETAILED DESCRIPTION OF THE PREFERRED EMBODIMENTS

First Embodiment

Figure 5:
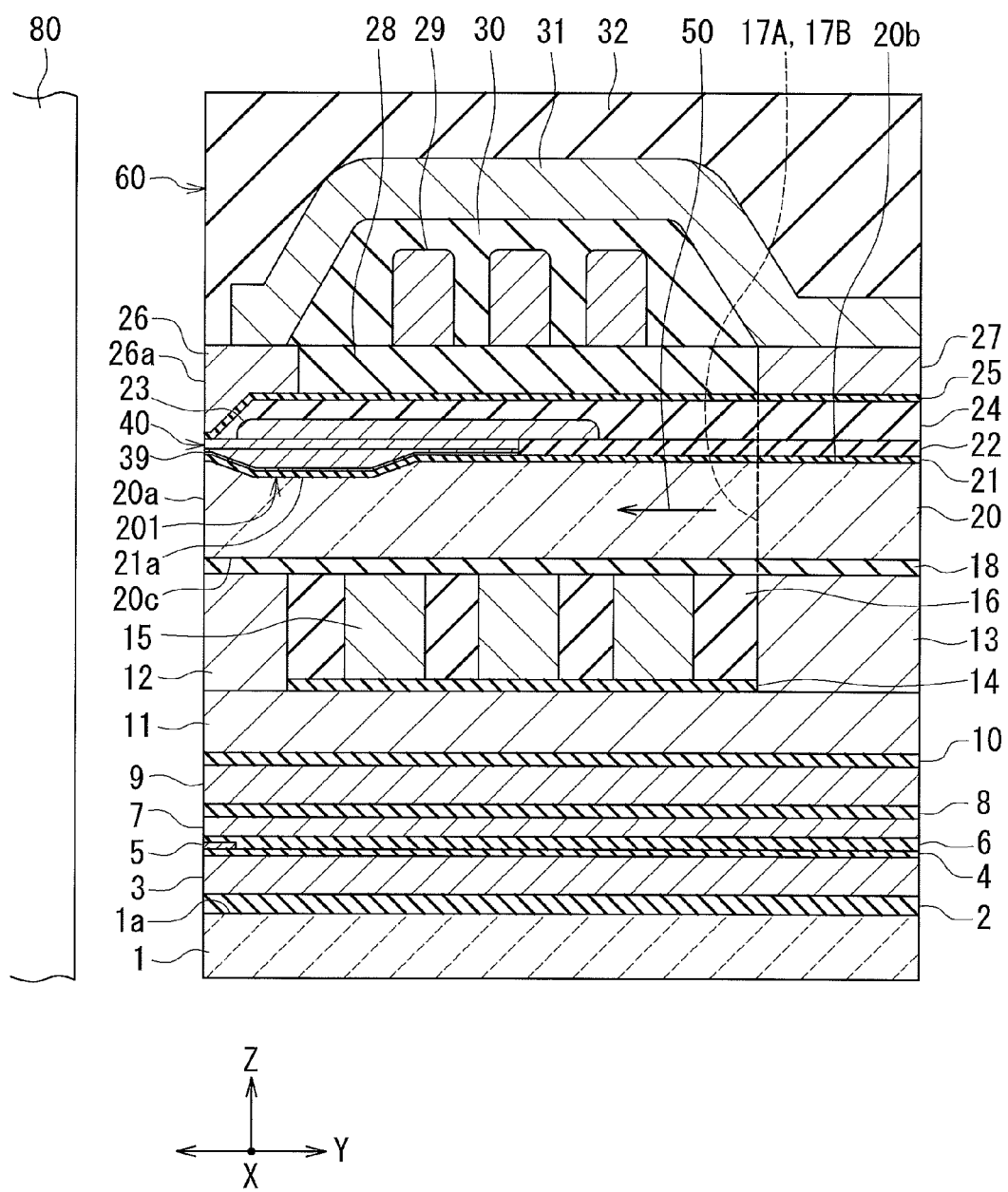
FIG. 5 is a cross-sectional view showing the configuration of the thermally-assisted magnetic recording head according to the first embodiment of the invention.
Figure 6:
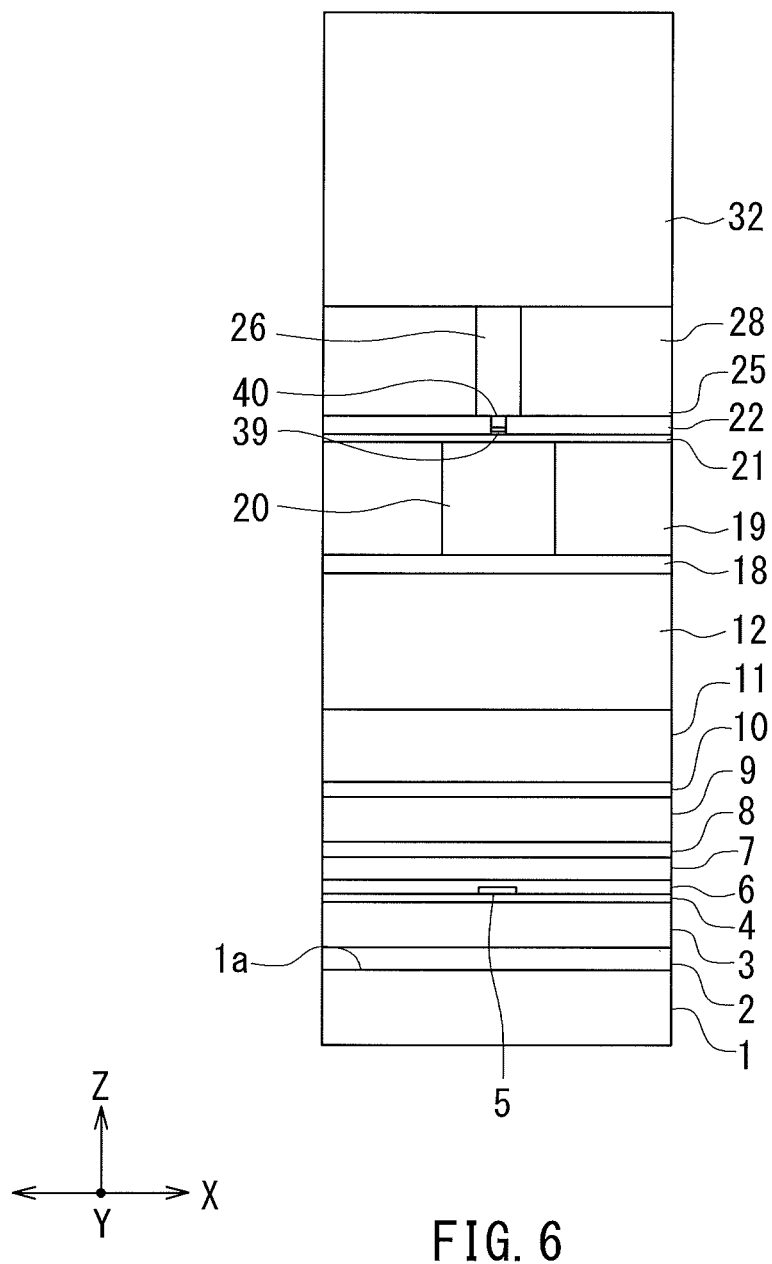
FIG. 6 is a front view showing the medium facing surface of the thermally-assisted magnetic recording head according to the first embodiment of the invention.

Preferred embodiments of the present invention will now be described in detail with reference to the drawings. First, reference is made to FIG. 5 and FIG. 6 to describe the configuration of a thermally-assisted magnetic recording head according to a first embodiment of the invention. FIG. 5 is a cross-sectional view showing the configuration of the thermally-assisted magnetic recording head. FIG. 6 is a front view showing the medium facing surface of the thermally-assisted magnetic recording head.

The thermally-assisted magnetic recording head according to the present embodiment is for use in perpendicular magnetic recording, and is in the form of a slider to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 5, the thermally-assisted magnetic recording head has a medium facing surface 60 facing a recording medium 80. Here, X direction, Y direction, and Z direction will be defined as follows. The X direction is the direction across the tracks of the recording medium 80, i.e., the track width direction. The Y direction is a direction perpendicular to the medium facing surface 60. The Z direction is the direction of travel of the recording medium 80 as viewed from the slider. The X, Y, and Z directions are orthogonal to one another.

As shown in FIG. 5 and FIG. 6, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 60. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head unit. The thermally-assisted magnetic recording head further includes: an insulating layer 8 disposed on the top shield layer 7; a middle shield layer 9 formed of a magnetic material and disposed on the insulating layer 8; and a nonmagnetic layer 10 formed of a nonmagnetic material and disposed on the middle shield layer 9. The insulating layer 8 and the nonmagnetic layer 10 are formed of alumina, for example.

The thermally-assisted magnetic recording head further includes a return pole layer 11 formed of a magnetic material and disposed on the nonmagnetic layer 10, and an insulating layer (not illustrated) disposed on the nonmagnetic layer 10 and surrounding the return pole layer 11. The return pole layer 11 has an end face located in the medium facing surface 60. The non-illustrated insulating layer is formed of alumina, for example.

The thermally-assisted magnetic recording head further includes: a shield layer 12 located near the medium facing surface 60 and lying on a portion of the return pole layer 11; a coupling layer 13 located away from the medium facing surface 60 and lying on another portion of the return pole layer 11; an insulating layer 14 lying on the remaining portion of the return pole layer 11 and on the non-illustrated insulating layer; and a coil 15 lying on the insulating layer 14. The shield layer 12 and the coupling layer 13 are each formed of a magnetic material. The shield layer 12 has an end face located in the medium facing surface 60. The coil 15 is planar spiral-shaped and wound around the coupling layer 13. The coil 15 is formed of a conductive material such as copper. The insulating layer 14 is formed of alumina, for example.

The thermally-assisted magnetic recording head further includes an insulating layer 16 disposed around the shield layer 12, the coupling layer 13 and the coil 15 and in the space between every adjacent turns of the coil 15, and two coupling portions 17A and 17B disposed on the coupling layer 13. The coupling portions 17A and 17B are each formed of a magnetic material. Each of the coupling portions 17A and 17B includes a first layer located on the coupling layer 13, and a second and a third layer stacked in this order on the first layer. The first layer of the coupling portion 17A and the first layer of the coupling portion 17B are aligned in the track width direction (the X direction). The insulating layer 16 is formed of alumina, for example.

The thermally-assisted magnetic recording head further includes a waveguide. The waveguide includes a core 20 through which light propagates, and a cladding provided around the core 20. The core 20 will be described in detail later.

The cladding includes cladding layers 18, 19 and 21. The cladding layer 18 lies on the shield layer 12, the coupling layer 13, the coil 15 and the insulating layer 16. The core 20 lies on the cladding layer 18. The cladding layer 19 lies on the cladding layer 18 and surrounds the core 20. The cladding layer 21 lies on the core 20 and the cladding layer 19.

The core 20 is formed of a dielectric material that transmits laser light to be used for generating near-field light. The laser light emitted from a laser diode (not illustrated) enters the core 20 and propagates through the core 20. The cladding layers 18, 19 and 21 are each formed of a dielectric material that has a refractive index lower than that of the core 20. For example, the core 20 may be formed of tantalum oxide such as $Ta_2O_5$ or silicon oxynitride (SiON), while the cladding layers 18, 19 and 21 may be formed of silicon dioxide ($SiO_2$) or alumina.

The first layers of the coupling portions 17A and 17B are embedded in the cladding layer 18. The second layers of the coupling portions 17A and 17B are embedded in the cladding layer 19. The second layer of the coupling portion 17A and the second layer of the coupling portion 17B are located on opposite sides of the core 20 in the track width direction (the X direction), each being at a distance from the core 20.

The thermally-assisted magnetic recording head further includes: a main pole 26 located near the medium facing surface 60 and lying above the core 20; a plasmon generator 40 located between the core 20 and the main pole 26; and an adhesion layer 39 interposed between the cladding layer 21 and the plasmon generator 40. The plasmon generator 40 is configured to excite surface plasmons on the principle to be described later. The adhesion layer 39 is to prevent the plasmon generator 40 from peeling away from the cladding layer 21. The adhesion layer 39 may be formed of one of Zr, ZrN, Ru, Pt, Pd, Ti, Ta, Ni, W, Cr, NiCr, NiFe, Co, Cu, TiW, TiN, Mo, Hf, and Rh, for example. The adhesion layer 39 may have a thickness of 0.3 to 1 nm, for example. The adhesion layer 39 is not an essential component of the thermally-assisted magnetic recording head, and can be dispensed with. The plasmon generator 40 will be described in detail later.

The main pole 26 has an end face 26a located in the medium facing surface 60. The main pole 26 may include a narrow portion having the end face 26a and an end opposite to the end face 26a, and a wide portion connected to the end of the narrow portion. The wide portion is greater than the narrow portion in width in the track width direction (the X direction).

The thermally-assisted magnetic recording head further includes: a dielectric layer 22 lying on the cladding layer 21 and surrounding the plasmon generator 40; a heat sink 23 lying over part of the plasmon generator 40 and part of the dielectric layer 22; a dielectric layer 24 disposed to cover the heat sink 23; and a dielectric layer 25 disposed to cover the plasmon generator 40 and the dielectric layer 24. The heat sink 23 has a maximum thickness in the range of 200 to 500 nm, for example. The dielectric layer 24 has a top surface, and an end face closest to the medium facing surface 60. The distance from the medium facing surface 60 to an arbitrary point on the aforementioned end face of the dielectric layer 24 decreases with decreasing distance from the arbitrary point to the top surface 1a of the substrate 1. The dielectric layer 24 has a maximum thickness in the range of 200 to 800 nm, for example.

The main pole 26 is disposed on the dielectric layer 25 so as to lie above part of each of the top surface of the plasmon generator 40, the end face of the dielectric layer 24 and the top surface of the dielectric layer 24. The dielectric layer 25 has a thickness in the range of, for example, 10 to 40 nm, preferably in the range of 15 to 25 nm.

The third layers of the coupling portions 17A and 17B are embedded in the cladding layer 21 and the dielectric layers 22, 24 and 25. The dielectric layers 22, 24 and 25 may be formed of $SiO_2$ or alumina, for example. The heat sink 23 is formed of a material having a high thermal conductivity, such as Au, Ag, Al, or Cu. The heat sink 23 has the function of dissipating heat generated at the plasmon generator 40. The heat sink 23 is not an essential component of the thermally-assisted magnetic recording head, and can be dispensed with.

The thermally-assisted magnetic recording head further includes a coupling layer 27 formed of a magnetic material and disposed over the third layers of the coupling portions 17A and 17B and the dielectric layer 25, and a dielectric layer 28 disposed around the main pole 26 and the coupling layer 27. The top surfaces of the main pole 26, the coupling layer 27 and the dielectric layer 28 are even with each other. The dielectric layer 28 is formed of $SiO_2$ or alumina, for example.

The thermally-assisted magnetic recording head further includes a coil 29 disposed on the dielectric layer 28, an insulating layer 30 disposed to cover the coil 29, and a yoke layer 31 formed of a magnetic material and disposed over the main pole 26, the coupling layer 27 and the insulating layer 30. The yoke layer 31 magnetically couples the main pole 26 and the coupling layer 27 to each other. The coil 29 is planar spiral-shaped and wound around a portion of the yoke layer 31 that lies on the coupling layer 27. The coil 29 is formed of a conductive material such as copper. The insulating layer 30 is formed of alumina, for example.

The thermally-assisted magnetic recording head further includes a protective layer 32 disposed to cover the yoke layer 31. The protective layer 32 is formed of alumina, for example.

The parts from the return pole layer 11 to the yoke layer 31 constitute a write head unit. The coils 15 and 29 produce magnetic fields corresponding to data to be written on the recording medium 80. The shield layer 12, the return pole layer 11, the coupling layer 13, the coupling portions 17A and 17B, the coupling layer 27, the yoke layer 31, and the main pole 26 form a magnetic path for passing magnetic fluxes corresponding to the magnetic fields produced by the coils 15 and 29. The coils 15 and 29 are connected in series or in parallel so that the magnetic flux corresponding to the magnetic field produced by the coil 15 and the magnetic flux corresponding to the magnetic field produced by the coil 29 flow in the same direction through the main pole 26. The main pole 26 allows the magnetic flux corresponding to the magnetic field produced by the coil 15 and the magnetic flux corresponding to the magnetic field produced by the coil 29 to pass, and produces a write magnetic field for writing data on the recording medium 80 by means of a perpendicular magnetic recording system.

The coil 15 is not an essential component of the thermally-assisted magnetic recording head, and can be dispensed with. The coil 29 may be wound helically around the yoke layer 31.

As has been described, the thermally-assisted magnetic recording head according to the present embodiment includes the medium facing surface 60, the read head unit, and the write head unit. The read head unit and the write head unit are stacked on the substrate 1. The write head unit is located on the trailing side, i.e., the front side in the direction of travel of the recording medium 80 (the Z direction) relative to the read head unit.

The thermally-assisted magnetic recording head may include a protective film covering the medium facing surface 60. The material of the protective film may be diamond-like-carbon (DLC) or $Ta_2O_5$, for example. The protective film is not an essential component of the thermally-assisted magnetic recording head and can be dispensed with.

The write head unit includes the coils 15 and 29, the main pole 26, and a near-field light generator according to the present embodiment. The near-filed light generator includes the waveguide and the plasmon generator 40. The waveguide includes the core 20 and the cladding. The cladding includes the cladding layers 18, 19 and 21. The main pole 26 is located on the front side in the direction of travel of the recording medium 80 (the Z direction) relative to the core 20. The plasmon generator 40 is located between the core 20 and the main pole 26.

Figure 1:
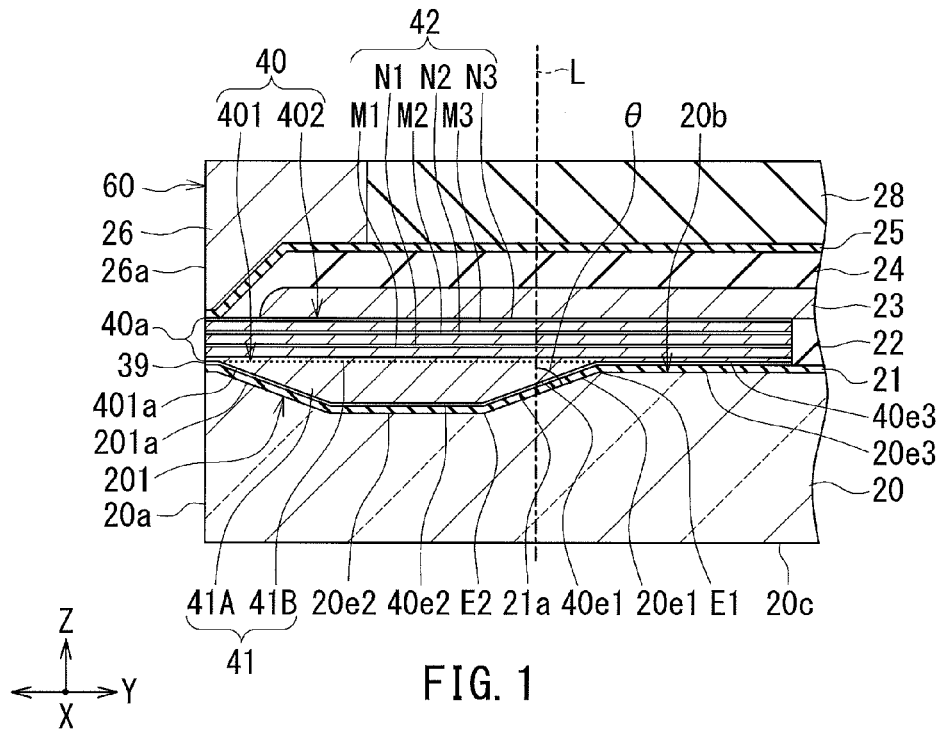
FIG. 1 is a cross-sectional view showing the main part of a thermally-assisted magnetic recording head according to a first embodiment of the invention.
Figure 2:
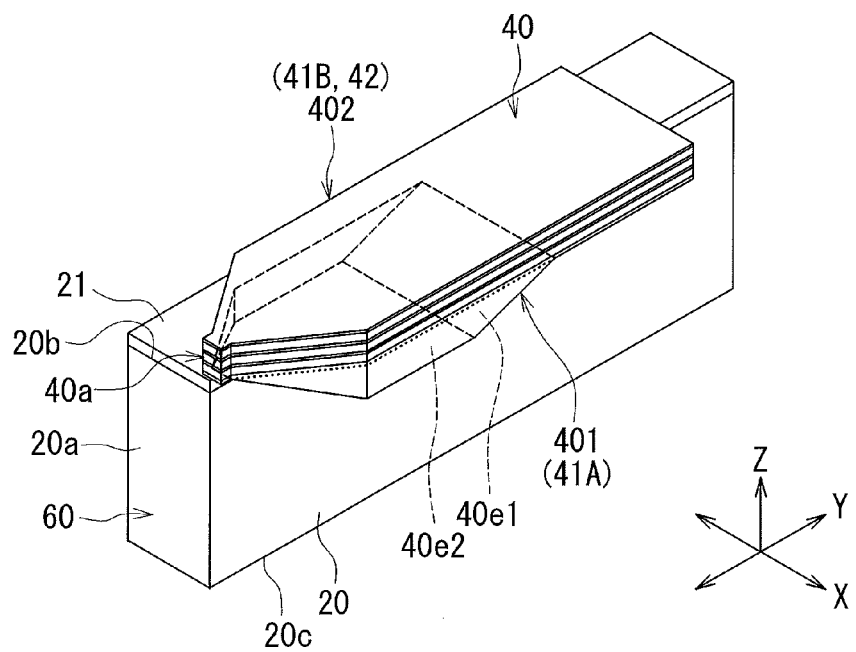
FIG. 2 is a perspective view showing a near-field light generator according to the first embodiment of the invention.
Figure 3:
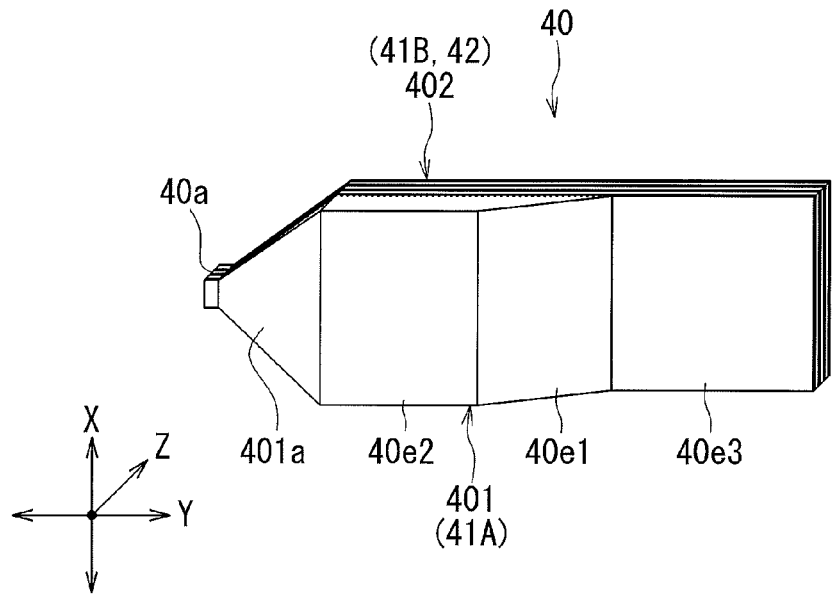
FIG. 3 is a perspective view of the plasmon generator shown in FIG. 1 and FIG. 2 as viewed from the core of the waveguide.
Figure 4:
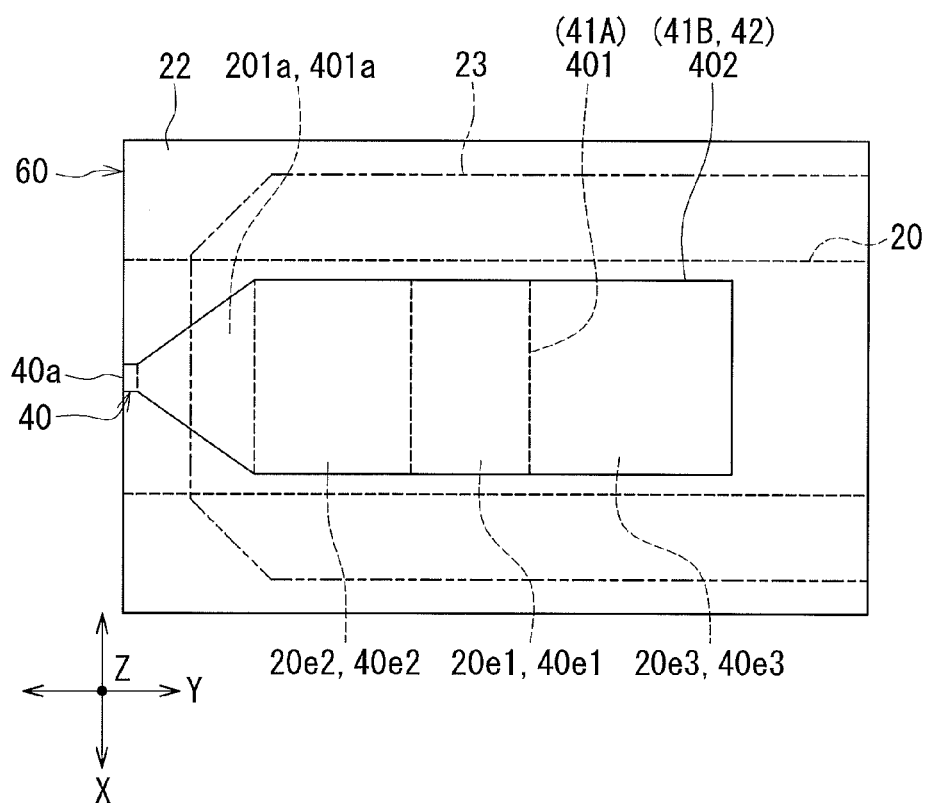
FIG. 4 is a plan view showing the positional relationship between the plasmon generator and the core of the waveguide shown in FIG. 1 and FIG. 2.

The core 20 and the plasmon generator 40 will now be described in detail with reference to FIG. 1 to FIG. 5. FIG. 1 is a cross-sectional view showing the main part of the thermally-assisted magnetic recording head according to the present embodiment. FIG. 2 is a perspective view showing the near-field light generator according to the present embodiment. Note that FIG. 2 omits some portions of the core 20. FIG. 3 is a perspective view of the plasmon generator 40 shown in FIG. 1 and FIG. 2 as viewed from the core 20 of the waveguide. FIG. 4 is a plan view showing the positional relationship between the plasmon generator 40 and the core 20 of the waveguide shown in FIG. 1 and FIG. 2.

As shown in FIG. 5, the core 20 extends in a direction perpendicular to the medium facing surface (the Y direction). In FIG. 5, the arrow labeled 50 indicates the direction of travel of laser light 50 propagating through the core 20. The direction of travel of the laser light 50 is parallel to the Y direction and toward the medium facing surface 60. As shown in FIG. 1 and FIG. 5, the core 20 has an end face 20a located in the medium facing surface 60, a first surface 20b serving as a top surface, a bottom surface 20c, and two side surfaces. The first surface 20b intersects the Z direction. The Z direction corresponds to the "first direction" in the present invention, and intersects the direction of travel of the laser light 50.

The core 20 has a concave portion 201 recessed from the first surface 20b. The concave portion 201 is located near the end face 20a. The concave portion 201 has a surface contiguous with the first surface 20b of the core 20. The cladding layer 21 covers the surface of the concave portion 201 and the first surface 20b of the core 20. The surface of the concave portion 201 includes a bottom surface having a quadrangular shape, and six wall faces connecting with the first surface 20b.

The surface of the concave portion 201 includes a first evanescent light generating portion 20e1, and a second evanescent light generating portion 20e2 that is located closer to the medium facing surface 60 than is the first evanescent light generating portion 20e1 and contiguous with the first evanescent light generating portion 20e1.

In the present embodiment, the aforementioned bottom surface included in the surface of the concave portion 201 forms the second evanescent light generating portion 20e2. Of the six wall faces included in the surface of the concave portion 201, one that is farthest from the medium facing surface 60 forms the first evanescent light generating portion 20e1. In FIG. 4 the boundary between the first evanescent light generating portion 20e1 and the second evanescent light generating portion 20e2 is indicated in a broken line. As shown in FIG. 4, the width of each of the first and second evanescent light generating portions 20e1 and 20e2 in the X direction is constant regardless of distance from the medium facing surface 60.

As shown in FIG. 1, the first evanescent light generating portion 20e1 has a first edge E1 closest to the first surface 20b and a second edge E2 farthest from the first surface 20b. The first evanescent light generating portion 20e1 and the second evanescent light generating portion 20e2 are connected to each other at the second edge E2. The distance from the medium facing surface 60 to an arbitrary point on the first evanescent light generating portion 20e1 decreases with decreasing distance from the arbitrary point to the second edge E2. In other words, the first evanescent light generating portion 20e1 is inclined relative to the medium facing surface 60 such that the second edge E2 is located closer to the medium facing surface 60 than is the first edge E1.

Here, the angle that the first evanescent light generating portion 20e1 forms relative to the Z direction (the first direction) will be referred to as angle $\theta$. In FIG. 1, the angle $\theta$ is shown as the angle formed relative to a virtual straight line L parallel to the Z direction. The angle $\theta$ preferably falls within the range of 45° to 80°, and more preferably within the range of 70° to 80°. The reason for this will be described in detail later.

FIG. 1 shows an example in which the second evanescent light generating portion 20e2 is perpendicular to the Z direction (the first direction), or equivalently, parallel to the XY plane. In this case, the second evanescent light generating portion 20e2 forms 90° relative to the Z direction (the first direction). Alternatively, the second evanescent light generating portion 20e2 may be slightly inclined relative to the XY plane. In such a case, the distance from the top surface 1a of the substrate 1 to an arbitrary point on the second evanescent light generating portion 20e2 may decrease with decreasing distance from the arbitrary point to the medium facing surface 60. The second evanescent light generating portion 20e2 in such a case forms an angle greater than the angle θ and smaller than 90° relative to the Z direction (the first direction).

In FIG. 1 and FIG. 4, the symbol 201a represents one of the six wall faces included in the surface of the concave portion 201, the one being located closer to the medium facing surface 60 than the second evanescent light generating portion 20e2. In FIG. 4 the boundary between the second evanescent light generating portion 20e2 and the wall face 201a is indicated in a broken line. The wall face 201a may be perpendicular to the Y direction, in other words, parallel to the medium facing surface 60, or may be inclined relative to the medium facing surface 60. Where the wall face 201a is inclined relative to the medium facing surface 60, the distance from the medium facing surface 60 to an arbitrary point on the wall face 201a increases with increasing distance from the arbitrary point to the first surface 20b of the core 20. FIG. 1 shows an example in which the wall face 201a is inclined relative to the medium facing surface 60. The angle that the wall face 201a forms relative to the Z direction (the first direction) preferably falls within the range of 45° to 80°, and more preferably within the range of 70° to 80°, as with the angle θ.

As shown in FIG. 4, the width of the wall face 201a in the X direction is equal to the width of the second evanescent light generating portion 20e2 at the boundary between the wall face 201a and the second evanescent light generating portion 20e2, and decreases toward the medium facing surface 60.

The first surface 20b of the core 20 includes a third evanescent light generating portion 20e3 that is located farther from the medium facing surface 60 than is the first evanescent light generating portion 20e1 and contiguous with the first evanescent light generating portion 20e1. In the example shown in FIG. 1, the third evanescent light generating portion 20e3 is perpendicular to the Z direction (the first direction), or equivalently, parallel to the XY plane. In this case, the third evanescent light generating portion 20e3 forms 90° relative to the Z direction (the first direction). Alternatively, the third evanescent light generating portion 20e3 may be slightly inclined relative to the XY plane. In such a case, the distance from the top surface 1a of the substrate 1 to an arbitrary point on the third evanescent light generating portion 20e3 may increase with increasing distance from the arbitrary point to the first edge E1 of the first evanescent light generating portion 20e1, that is, with increasing distance from the arbitrary point to the medium facing surface 60. The third evanescent light generating portion 20e3 in such a case forms an angle greater than the angle θ and smaller than 90° relative to the Z direction (the first direction).

As shown in FIG. 1 to FIG. 4, the plasmon generator 40 has a front end face 40a. The front end face 40a generates near-field light on the principle to be described later. The front end face 40a is located in the medium facing surface 60 along with the end face 20a of the core 20 and the end face 26a of the main pole 26.

A virtual plane including the front end face of the plasmon generator is defined for the near-field light generator of the present invention. In the present embodiment, the position of the virtual plane including the front end face 40a of the plasmon generator 40 coincides with the position of the medium facing surface 60.

As shown in FIG. 1, the plasmon generator 40 includes a first layer 41 and a multilayer film portion 42. The first layer 41 lies on the adhesion layer 39. The first layer 41 has a top surface located at a higher level than the top surface of a portion of the adhesion layer 39 that lies on the first surface 20b of the core 20. The multilayer film portion 42 lies on the first layer 41. The heat sink 23 is in contact with the top surface of the multilayer film portion 42.

The first layer 41 is formed of a metal material. The metal material used to form the first layer 41 may be one of Au, Ag, Al and Cu, for example.

As shown in FIG. 1, the first layer 41 includes a main portion 41A and a bonding portion 41B. In FIG. 1 the boundary between the main portion 41A and the bonding portion 41B is indicated in a dotted line. Most part of the main portion 41A is received in the concave portion 201 of the core 20 with the cladding layer 21 and the adhesion layer 39 interposed between the main portion 41A and the core 20. The boundary between the main portion 41A and the bonding portion 41B is located at the same level as the top surface of the portion of the adhesion layer 39 that lies on the first surface 20b of the core 20. The bonding portion 41B has an end located in the front end face 40a and lies over the main portion 41A and the adhesion layer 39. The bonding portion 41B has the function of bonding the multilayer film portion 42 to the main portion 41A.

The main portion 41A has a thickness in the range of 80 to 300 nm, for example. The bonding portion 41B has a thickness in the range of 1 to 5 nm, for example.

As shown in FIG. 1, the multilayer film portion 42 includes at least a first metal layer M1, a second metal layer M2, and an intermediate layer N1. The intermediate layer N1 is interposed between the first metal layer M1 and the second metal layer M2. Each of the first metal layer M1, the second metal layer M2 and the intermediate layer N1 has an end located in the front end face 40a. Each of the first and second metal layers M1 and M2 is formed of a metal material. The intermediate layer N1 is formed of a material that is higher in Vickers hardness than the metal material used to form the first metal layer M1 and the metal material used to form the second metal layer M2. The material used to form the intermediate layer N1 may be a metal material different from the metal material used to form the first metal layer M1 and the metal material used to form the second metal layer M2, or may be a dielectric material. Hereinafter, the metal material used to form the first metal layer M1 and the metal material used to form the second metal layer M2 will each be referred to as a metal layer material, and the material used to form the intermediate layer N1 will be referred to as an intermediate layer material. The intermediate layer material is higher in Vickers hardness than the metal layer material. Where the intermediate layer material is a metal material, the metal layer material is preferably higher in electrical conductivity than the intermediate layer material.

In the example shown in FIG. 1, the intermediate layer N1 and the second metal layer M2 are stacked in this order on the first metal layer M1. In this example, the multilayer film portion 42 further includes a second intermediate layer N2, a third metal layer M3, and a protective layer N3 stacked in this order on the second metal layer M2. Each of the second intermediate layer N2, the third metal layer M3 and the protective layer N3 has an end located in the front end face 40a. The metal layer M3 is formed of the metal layer material. Each of the intermediate layer N2 and the protective layer N3 is formed the intermediate layer material. The protective layer N3 has the function of protecting the plasmon generator 40 and the function of enhancing adhesion of the dielectric layers 24 and 25 to the plasmon generator 40.

Examples of the metal layer material include Au, Ag, Al and Cu. Examples of metal materials selectable as the intermediate layer material include Zr, ZrN, Ru, Pt, Pd, Ti, Ta, Ni, W, Cr, NiCr, NiFe, Co, Cu, TiW, TiN, Mo, Hf, and Rh. Examples of dielectric materials selectable as the intermediate layer material include $SiO_2$, alumina, MgO, amorphous SiC, tantalum oxide, SiON, $ZrO_X$, $HfO_X$, and $NbO_X$, where "x" in $ZrO_X$, $HfO_X$ and $NbO_X$ represents any number greater than zero. When the metal layer material is Cu, the intermediate layer material is other than Cu.

As far as the requirement that the intermediate layer material be higher in Vickers hardness than the metal layer material is satisfied, the materials used to form the metal layers M1 to M3 may all be the same or may be different from each other, or two of them may be the same. Likewise, the materials used to form the intermediate layers N1 and N2 and the protective layer N3 may all be the same or may be different from each other, or two of them may be the same.

The intermediate layers N1 and N2 and the protective layer N3 may be smaller in thickness than the metal layers M1 to M3. The thickness of each of the metal layers M1 to M3 preferably falls within the range of 5 to 25 nm, and the thickness of each of the intermediate layers N1 and N2 and the protective layer N3 preferably falls within the range of 0.5 to 2 nm.

For example, each of the metal layers M1 to M3 may be a 10- to 20-nm-thick layer of Au, and each of the intermediate layers N1 and N2 and the protective layer N3 may be a 0.5- to 1-nm-thick layer of Zr. Alternatively, each of the metal layers M1 to M3 may be a 5- to 25-nm-thick layer of Au, and each of the intermediate layers N1 and N2 and the protective layer N3 may be a 0.5- to 2-nm-thick layer of ZrN.

As shown in FIG. 1 to FIG. 3, the plasmon generator 40 includes a first portion 401 and a second portion 402 that are adjacent in the Z direction (the first direction). The main portion 41A of the first layer 41 forms the first portion 401. The bonding portion 41B of the first layer 41 and the multilayer film portion 42 form the second portion 402. The second portion 402 thus includes at least the first metal layer M1, the second metal layer M2 and the intermediate layer N1. The dotted line shown in each of FIG. 1 to FIG. 3 also indicates the boundary between the first portion 401 and the second portion 402.

The second portion 402 includes the front end face 40a. The front end face 40a has a width in the range of 5 to 40 nm, for example. No part of the first portion 401 forms any part of the front end face 40a.

The first portion 401 (the main portion 41A) has a bottom surface opposed to the bottom surface included in the surface of the concave portion 201, and six side surfaces opposed to the six wall faces included in the surface of the concave portion 201. The first evanescent light generating portion 20e1 is located father from the medium facing surface 60 or the virtual plane than is the first portion 401 of the plasmon generator 40.

As shown in FIG. 1 and FIG. 3, the first portion 401 includes a first plasmon exciting portion 40e1 and a second plasmon exciting portion 40e2. Of the six side surfaces of the first portion 401, one that is located farthest from the medium facing surface 60 forms the first plasmon exciting portion 40e1. The bottom surface of the first portion 401 forms the second plasmon exciting portion 40e2. In FIG. 4, the broken line indicating the boundary between the first and second evanescent light generating portions 20e1 and 20e2 also indicates the boundary between the first and second plasmon exciting portions 40e1 and 40e2. As shown in FIG. 3 and FIG. 4, the width of each of the first and second plasmon exciting portions 40e1 and 40e2 in the X direction is constant regardless of distance from the medium facing surface 60.

The first plasmon exciting portion 40e1 is opposed to the first evanescent light generating portion 20e1 with the cladding layer 21 interposed therebetween. As shown in FIG. 1, the first plasmon exciting portion 40e1 is inclined in a similar manner as the first evanescent light generating portion 20e1. More specifically, the distance from the medium facing surface 60 to an arbitrary point on the first plasmon exciting portion 40e1 decreases with decreasing distance from the arbitrary point to the boundary between the first and second plasmon exciting portions 40e1 and 40e2. A preferred range of the angle that the first plasmon exciting portion 40e1 forms relative to the Z direction (the first direction) is the same as the preferred range of the angle θ that the first evanescent light generating portion 20e1 forms relative to the Z direction (the first direction).

The second plasmon exciting portion 40e2 is opposed to the second evanescent light generating portion 20e2 with the cladding layer 21 interposed therebetween. The second evanescent light generating portion 20e2 and the second plasmon exciting portion 40e2 are adjacent in the Z direction (the first direction). In the example shown in FIG. 1, the second plasmon exciting portion 40e2 is perpendicular to the Z direction (the first direction), or equivalently, parallel to the XY plane, as is the second evanescent light generating portion 20e2. Alternatively, the second plasmon exciting portion 40e2 may be slightly inclined relative to the XY plane. In such a case, the distance from the top surface 1a of the substrate 1 to an arbitrary point on the second plasmon exciting portion 40e2 may decrease with decreasing distance from the arbitrary point to the medium facing surface 60. The angle that the second plasmon exciting portion 40e2 forms relative to the Z direction (the first direction) in such a case is, for example, the same as the angle that the second evanescent light generating portion 20e2 forms relative to the Z direction (the first direction).

In FIG. 1, FIG. 3 and FIG. 4, the symbol 401a represents one of the six side surfaces of the first portion 401, the one being located closer to the medium facing surface 60 than the second plasmon exciting portion 40e2 (the bottom surface of the first portion 401) and contiguous with the second plasmon exciting portion 40e2. In FIG. 4, the broken line indicating the boundary between the second evanescent light generating portion 20e and the wall face 201a also indicates the boundary between the second plasmon exciting portion 40e2 and the side surface 401a. The side surface 401a is opposed to the wall face 201a with the cladding layer 21 interposed therebetween, and is not exposed in the medium facing surface 60. Like the wall face 201a, the side surface 401a may be perpendicular to the Y direction or inclined relative to the Z direction (the first direction). Where the side surface 401a is inclined relative to the Z direction, the distance from the medium facing surface 60 to an arbitrary point on the side surface 401a increases with increasing distance from the arbitrary point to the top surface of the first portion 401, that is, with decreasing distance from the arbitrary point to the top surface 1*a* of the substrate 1. FIG. 1 to FIG. 3 show an example in which the side surface 401*a* is inclined relative to the Z direction. The angle that the side surface 401*a* forms relative to the Z direction (the first direction) is, for example, the same as the angle that the wall face 201*a* forms relative to the Z direction (the first direction).

As shown in FIG. 3 and FIG. 4, the width of the side surface 401*a* in the X direction is equal to the width of the second plasmon exciting portion 40*e*2 at the boundary between the side surface 401*a* and the second plasmon exciting portion 40*e*2, and decreases toward the medium facing surface 60.

As shown in FIG. 2 to FIG. 4, the second portion 402 includes a narrow portion located near the medium facing surface 60, and a wide portion located farther from the medium facing surface 60 than the narrow portion. The width of the narrow portion in the X direction may be constant regardless of distance from the medium facing surface 60, or may decrease toward the medium facing surface 60. The width of the wide portion in the X direction is equal to that of the narrow portion at the boundary position between the narrow portion and the wide portion, and is greater than that of the narrow portion in the other positions.

The bottom surface of the bonding portion 41B of the first layer 41 forms the bottom surface of the second portion 402. The bottom surface of the second portion 402 includes a front portion and a rear portion. The front portion is the portion lying between the medium facing surface 60 and an edge of the side surface 401*a* of the first portion 401 closest to the medium facing surface 60. At least part of the front portion is included in the narrow portion. The rear portion is located farther from the medium facing surface 60 than is an edge of the first plasmon exciting portion 40*e*1 of the first portion 401 farthest from the medium facing surface 60. The rear portion is included in the wide portion.

The second portion 402 includes a third plasmon exciting portion 40*e*3 opposed to the third evanescent light generating portion 20*e*3. In the present embodiment, the third plasmon exciting portion 40*e*3 is formed by the rear portion of the bottom surface of the second portion 402 (the bottom surface of the bonding portion 41B). The third evanescent light generating portion 20*e*3 and the third plasmon exciting portion 40*e*3 are adjacent in the Z direction (the first direction). In the example shown in FIG. 1, the third plasmon exciting portion 40*e*3 is perpendicular to the Z direction (the first direction), or equivalently, parallel to the XY plane, as is the third evanescent light generating portion 20*e*3. Alternatively, the third plasmon exciting portion 40*e*3 may be slightly inclined relative to the XY plane. In such a case, the distance from the top surface 1*a* of the substrate 1 to an arbitrary point on the third plasmon exciting portion 40*e*3 may increase with increasing distance from the arbitrary point to the first plasmon exciting portion 40*e*1, that is, with increasing distance from the arbitrary point to the medium facing surface 60. The angle that the third plasmon exciting portion 40*e*3 forms relative to the Z direction (the first direction) is, for example, the same as the angle that the third evanescent light generating portion 20*e*3 forms relative to the Z direction (the first direction).

The distance between the medium facing surface 60 and an edge of the third plasmon exciting portion 40*e*3 closest to the medium facing surface 60 falls within the range of, for example, 0.6 to 1.6 µm, and preferably within the range of 0.8 to 1.2 µm. The third plasmon exciting portion 40*e*3 has a length in the Y direction within the range of, for example, 0.3 to 1.5 µm, and preferably within the range of 0.5 to 1 µm.

The cladding layer 21 includes an interposition part 21*a* interposed between the first to third evanescent light generating portions 20*e*1 to 20*e*3 and the first to third plasmon exciting portions 40*e*1 to 40*e*3. Since the cladding layer 21 is part of the cladding, the cladding can be said to include the interposition part 21*a*. The interposition part 21*a* has a thickness within the range of, for example, 10 to 100 nm, and preferably within the range of 20 to 30 nm.

Now, the principle of generation of near-field light in the present embodiment and the principle of thermally-assisted magnetic recording using near-field light will be described in detail. Laser light emitted from a laser diode (not illustrated) enters the core 20. As shown in FIG. 5, the laser light 50 propagates through the core 20 toward the medium facing surface 60, and reaches the vicinity of the plasmon generator 40. Each of the first to third evanescent light generating portions 20*e*1 to 20*e*3 of the core 20 generates evanescent light based on the laser light 50 propagating through the core 20. More specifically, when the laser light 50 is totally reflected at the first evanescent light generating portion 20*e*1, the first evanescent light generating portion 20*e*1 generates first evanescent light permeating into the interposition part 21*a*. When the laser light 50 is totally reflected at the second evanescent light generating portion 20*e*2, the second evanescent light generating portion 20*e*2 generates second evanescent light permeating into the interposition part 21*a*. When the laser light 50 is totally reflected at the third evanescent light generating portion 20*e*3, the third evanescent light generating portion 20*e*3 generates third evanescent light permeating into the interposition part 21*a*.

In the plasmon generator 40, first surface plasmons are excited on the first plasmon exciting portion 40*e*1 through coupling with the first evanescent light. Second surface plasmons are excited on the second plasmon exciting portion 40*e*2 through coupling with the second evanescent light. Third surface plasmons are excited on the third plasmon exciting portion 40*e*3 through coupling with the third evanescent light. The first to third surface plasmons propagate along the surfaces of the first and second portions 401 and 402 to reach the front end face 40*a*. As a result, the first to third surface plasmons concentrate at the front end face 40*a*, and near-field light is generated from the front end face 40*a* based on the first to third surface plasmons.

The near-field light generated from the front end face 40*a* is projected toward the recording medium 80, reaches the surface of the recording medium 80 and heats a part of the magnetic recording layer of the recording medium 80. This lowers the coercivity of the part of the magnetic recording layer. In thermally-assisted magnetic recording, the part of the magnetic recording layer with the lowered coercivity is subjected to a write magnetic field produced by the main pole 26 for data writing.

A method of manufacturing the thermally-assisted magnetic recording head according to the present embodiment will now be described. The method of manufacturing the thermally-assisted magnetic recording head includes the steps of forming components of a plurality of thermally-assisted magnetic recording heads, except the substrates 1, on a wafer that includes portions to become the substrates 1 of the plurality of thermally-assisted magnetic recording heads, thereby fabricating a substructure including a plurality pre-head portions arranged in rows, the plurality of pre-head portions becoming individual thermally-assisted magnetic recording heads later; and cutting the substructure to separate the plurality of pre-head portions from each other and forming the medium facing surface 60 for each of the plurality of pre-head portions (this step will be referred to as the step of forming the medium facing surface 60). A plurality of thermally-assisted magnetic recording heads are produced in this manner.

The method of manufacturing the thermally-assisted magnetic recording head according to the present embodiment will now be described in more detail with attention focused on a single thermally-assisted magnetic recording head. The method of manufacturing the thermally-assisted magnetic recording head forms the insulating layer 2, the bottom shield layer 3, and the bottom shield gap film 4 in this order on the substrate 1 first. Next, the MR element 5 and two leads (not illustrated) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

Then, the return pole layer 11 is formed on the nonmagnetic layer 10. Next, an insulating layer (not illustrated) is formed to cover the return pole layer 11. The non-illustrated insulating layer is then polished by, for example, chemical mechanical polishing (hereinafter referred to as CMP), until the return pole layer 11 is exposed. Next, the insulating layer 14 is formed over the return pole layer 11 and the non-illustrated insulating layer. The insulating layer 14 is then selectively etched to form therein two openings for exposing the top surface of the return pole layer 11. The shield layer 12 and the coupling layer 13 are then formed on the return pole layer 11 at the positions of the two openings. Next, the coil 15 is formed on the insulating layer 14.

Next, the insulating layer 16 is formed over the entire top surface of the stack. The insulating layer 16 is then polished by, for example, CMP, until the shield layer 12, the coupling layer 13 and the coil 15 are exposed. Next, although not illustrated, the first layers of the coupling portions 17A and 17B are formed on the coupling layer 13. Then, the cladding layer 18 is formed over the entire top surface of the stack. The cladding layer 18 is then polished by, for example, CMP, until the first layers of the coupling portions 17A and 17B are exposed.

Reference is now made to FIG. 7A through FIG. 14B to describe steps to be performed after the polishing of the cladding layer 18 up to the formation of the dielectric layer 28. The following descriptions include the description of a method of manufacturing the near-field light generator according to the present embodiment. FIG. 7A through FIG. 14B each show a stack of layers formed in the process of manufacturing the thermally-assisted magnetic recording head. Note that portions located below the core 20 are omitted from FIG. 7A through FIG. 14B. FIGS. 7A-14A each show a cross section that intersects the end face 26a of the main pole 26 and that is perpendicular to the medium facing surface 60 and to the top surface 1a of the substrate 1. FIGS. 7B-14B each show a cross section of the stack taken at the position at which the medium facing surface 60 is to be formed. In FIGS. 7A-14A, the symbol "ABS" indicates the position at which the medium facing surface 60 is to be formed.

FIG. 7A and FIG. 7B show a step that follows the polishing of the cladding layer 18. In this step, first, an initial core having a top surface is formed on the cladding layer 18. The initial core will become the core 20 later. The initial core is formed by, for example, first forming a dielectric layer over the entire top surface of the stack and then patterning the dielectric layer by etching a portion of the dielectric layer by reactive ion etching (hereinafter referred to as RIE). The planar shape of the initial core is the same as that of the core 20. Next, although not illustrated, the second layers of the coupling portions 17A and 17B are formed on the first layers of the coupling portions 17A and 17B, respectively.

Next, the cladding layer 19 is formed over the entire top surface of the stack. The cladding layer 19 is then polished by, for example, CMP, until the initial core and the second layers of the coupling portions 17A and 17B are exposed. Next, a portion of the top surface of the initial core is etched to form the concave portion 201 in the initial core. In this etching process, the first evanescent light generating portion 20e1 and the wall face 201a, which are inclined planes, are formed by taper-etching employing RIE or ion beam etching, for example. The initial core becomes the core 20 when the concave portion 201 is formed. The remaining unetched portion of the top surface of the initial core becomes the first surface 20b of the core 20. Next, the cladding layer 21 and the adhesion layer 39 are formed in this order over the entire top surface of the stack.

Then, a metal film 41P is formed on the adhesion layer 39 by sputtering, for example. The metal film 41P will later become the first layer 41 of the plasmon generator 40. The metal film 41P is formed such that the top surface of its portion received in the concave portion 201 is higher in level than the top surface of the first layer 41 to be formed later.

FIG. 8A and FIG. 8B show the next step. In this step, first, the metal film 41P is polished by, for example, CMP, until the top surface of the metal film 41P reaches the level of the top surface of the first layer 41 (the top surface of the bonding portion 41B) to be formed later. The first portion 401 of the plasmon generator 40 is thereby completed. In FIG. 8A the boundary between the first portion 401 and the remainder of the metal film 41P is indicated in a dotted line. As shown in FIG. 8A, at least part of the first portion 401 is formed to be received in the concave portion 201. Next, a plurality of films that will later become the layers of the multilayer film portion 42 of the plasmon generator 40 are formed in succession on the metal film 41P by sputtering, for example. A multilayer film 42P composed of the plurality of films is thereby formed.

FIG. 9A and FIG. 9B show the next step. In this step, first, an etching mask (not illustrated) is formed on the multilayer film 42P. The adhesion layer 39, the metal film 41P and the multilayer film 42P are then etched in part by, for example, RIE, using the etching mask. The remaining portions of the metal film 41P and the multilayer film 42P thereby become the first layer 41 and the multilayer film portion 42, respectively, whereby the second portion 402 of the plasmon generator 40 is completed. In FIG. 9A the boundary between the first portion 401 and the second portion 402 is indicated in a dotted line. The etching mask is then removed.

FIG. 10A and FIG. 10B show the next step. In this step, first, the dielectric layer 22 is formed over the entire top surface of the stack. The dielectric layer 22 is then polished by, for example, CMP, until the plasmon generator 40 is exposed.

FIG. 11A and FIG. 11B show the next step. In this step, the heat sink 23 is formed on the plasmon generator 40 and the dielectric layer 22.

FIG. 12A and FIG. 12B show the next step. In this step, the dielectric layer 24 is formed to cover the heat sink 23.

FIG. 13A and FIG. 13B show the next step. In this step, first, the dielectric layer 25 is formed to cover the dielectric layer 24. The cladding layer 21 and the dielectric layers 22, 24 and 25 are then selectively etched to form therein two openings for exposing the respective top surfaces of the second layers of the coupling portions 17A and 17B. Next, the third layers of the coupling portions 17A and 17B are formed on the second layers of the coupling portions 17A and 17B, respectively. Then, the main pole 26 is formed on the dielectric layer 25, and the coupling layer 27 is formed on the third layers of the coupling portions 17A and 17B and the dielectric layer 25.

FIG. 14A and FIG. 14B show the next step. In this step, first, the dielectric layer 28 is formed over the entire top surface of the stack. The dielectric layer 28 is then polished by, for example, CMP, until the main pole 26 and the coupling layer 27 are exposed. The top surfaces of the main pole 26, the coupling layer 27 and the dielectric layer 28 are thereby made even with each other.

Now, steps to follow the step of FIG. 14A and FIG. 14B will be described with reference to FIG. 5 and FIG. 6. First, the coil 29 is formed on the dielectric layer 28. The insulating layer 30 is then formed to cover the coil 29. Next, the yoke layer 31 is formed over the main pole 26, the coupling layer 27 and the insulating layer 30. Then, the protective layer 32 is formed to cover the yoke layer 31. Wiring, terminals, and other components are then formed on the top surface of the protective layer 32. When the substructure is completed thus, the step of forming the medium facing surface 60 is performed. A protective film for covering the medium facing surface 60 may be formed thereafter. Being provided with the medium facing surface 60, each pre-head portion becomes a thermally-assisted magnetic recording head.

The step of forming the medium facing surface 60 includes the step of polishing the surface that is formed for each pre-head portion by cutting the substructure, and the step of forming a rail on the polished surface for allowing the slider to fly.

In the aforementioned polishing step, the layers exposed in the medium facing surface 60 may be polished in different amounts due to differences between materials used for those layers, and this may cause irregularities on the medium facing surface 60.

Further, in the aforementioned polishing step, polishing residues of the metal materials may grow to cause smears. In order to remove the smears, the step of forming the medium facing surface 60 may include the step of etching the polished surface slightly by, for example, ion beam etching, after the polishing step.

The method of manufacturing the thermally-assisted magnetic recording head according to the present embodiment includes a method of manufacturing the near-field light generator according to the present embodiment. The method of manufacturing the near-field light generator includes the steps of forming the core 20, forming the cladding, and forming the plasmon generator 40. The step of forming the core 20 includes the step of forming the initial core having the top surface, and the step of forming the concave portion 201 in the initial core by etching a portion of the top surface of the initial core. The step of forming the plasmon generator 40 includes the step of forming the first portion 401 and the step of forming the second portion 402 after the step of forming the first portion 401. In the step of forming the plasmon generator 40, the plasmon generator 40 is formed such that at least part of the first portion 401 is received in the concave portion 201.

The effects of the near-field light generator and the thermally-assisted magnetic recording head according to the present embodiment will now be described. In the present embodiment, the plasmon generator 40 includes the first portion 401 and the second portion 402. The second portion 402 includes the front end face 40a of the plasmon generator 40. The first portion 401 includes the first and second plasmon exciting portions 40e1 and 40e2. The present embodiment allows the dimension of the front end face 40a in the Z direction and the area of the front end face 40a to be smaller than in the case where the thickness of the entire plasmon generator and the dimension of the front end face of the plasmon generator in the Z direction are equal. Consequently, the present embodiment makes it possible to increase the volume and the surface area of the first portion 401 to allow for excitation of a lot of surface plasmons on the plasmon generator 40 without increasing the area of the front end face 40a.

Further, in the present embodiment the second portion 402 of the plasmon generator 40 includes the third plasmon exciting portion 40e3. The present embodiment thereby allows more surface plasmons to be excited on the plasmon generator 40.

Further, since the front end face 40a is allowed to have a small area, it is possible to prevent the front end face 40a from being significantly recessed relative to the other parts of the medium facing surface 60 in the step of forming the medium facing surface 60. The present embodiment thus makes it possible to prevent degradation in heating performance of the plasmon generator 40 that would occur where the front end face 40a is significantly recessed relative to the other parts of the medium facing surface 60. Moreover, since the front end face 40a is allowed to have a small area, it is possible to prevent the plasmon generator 40 from expanding and significantly protruding toward the recording medium 80 when the plasmon generator 40 increases in temperature. The present embodiment thus makes it possible to prevent damage to the recording medium 80, breakage of the plasmon generator 40 or the protective film covering the medium facing surface 60, and corrosion of the plasmon generator 40.

In the present embodiment, at least part of the first portion 401 is received in the concave portion 201 of the core 20. The surface of the concave portion 201 includes the first evanescent light generating portion 20e1. The first plasmon exciting portion 40e1 is opposed to the first evanescent light generating portion 20e1. Of the six wall faces included in the surface of the concave portion 201, one that is located farthest from the medium facing surface 60 forms the first evanescent light generating portion 20e1.

Now, the effects of the near-field light generator and the thermally-assisted magnetic recording head according to the present embodiment will be described in more detail in comparison with near-field light generators of first and second comparative examples. The near-field light generator of the first comparative example includes a core of a first comparative example and a plasmon generator of a first comparative example, in place of the core 20 and the plasmon generator 40 of the present embodiment. The core of the first comparative example does not include the concave portion 201. The plasmon generator of the first comparative example does not include the first portion 401, and consists only of the second portion 402. In the near-field light generator of the first comparative example, the bottom surface of the plasmon generator of the first comparative example is opposed to the top surface of the core of the first comparative example with the cladding layer 21 interposed therebetween. The bottom surface of the plasmon generator of the first comparative example and the top surface of the core of the first comparative example are both parallel to the direction of travel of laser light propagating through the core of the first comparative example. In the near-field light generator of the first comparative example, the top surface of the core of the first comparative example generates evanescent light, and surface plasmons are excited on the bottom surface of the plasmon generator of the first comparative example based on the evanescent light.

In the near-field light generator of the first comparative example, the amount of light reaching the top surface of the core of the first comparative example constitutes an insignificant proportion of the total laser light propagating through the core of the first comparative example. Thus, it is difficult to generate much evanescent light on the top surface of the core of the first comparative example, and consequently it is difficult to excite a lot of surface plasmons on the plasmon generator of the first comparative example. Further, in the near-field light generator of the first comparative example, the plasmon generator of the first comparative example is thin and has a small volume. This also makes it difficult to excite a lot of surface plasmons on the plasmon generator of the first comparative example.

The near-field light generator of the second comparative example includes a core of a second comparative example and a plasmon generator of a second comparative example, in place of the core 20 and the plasmon generator 40 of the present embodiment. The core of the second comparative example includes a concave portion of a second comparative example in place of the concave portion 201 of the present embodiment. The concave portion of the second comparative example has a surface including a bottom surface and six wall faces, as does the concave portion 201. In the concave portion of the second comparative example, however, one of the six wall faces that is located farthest from the medium facing surface 60 is parallel to the medium facing surface 60. The plasmon generator of the second comparative example includes a first portion and a second portion, as does the plasmon generator 40. Of the six side surfaces of the first portion, however, one that is located farthest from the medium facing surface 60 is parallel to the medium facing surface 60.

The near-field light generator of the second comparative example allows the plasmon generator to be larger in volume when compared with the first comparative example. In the core of the second comparative example, however, one of the six wall faces included in the surface of the concave portion of the second comparative example, the one being located farthest from the medium facing surface 60, is perpendicular to the direction of laser light propagating through the core of the second comparative example. This one of the wall faces therefore cannot allow total reflection of the laser light propagating through the core of the second comparative example, thus causing no evanescent light to be generated. In the core of the second comparative example, evanescent light is generated at the bottom surface included in the surface of the concave portion of the second comparative example. However, the amount of light reaching the aforementioned bottom surface constitutes an insignificant proportion of the total laser light propagating through the core of the second comparative example. It is thus difficult to generate much evanescent light on the aforementioned bottom surface, and consequently it is difficult to excite a lot of surface plasmons on the plasmon generator of the second comparative example.

In the present embodiment, the core 20 includes the concave portion 201 and the plasmon generator 40 includes the first portion 401. This allows the plasmon generator 40 to be larger in volume than the plasmon generator of the first comparative example.

Further, the surface of the concave portion 201 of the core 20 of the present embodiment includes the first evanescent light generating portion 20e1, instead of the wall face farthest from the medium facing surface 60 among the six wall faces of the surface of the concave portion of the second comparative example. The distance from the medium facing surface 60 or the virtual plane to an arbitrary point on the first evanescent light generating portion 20e1 decreases with decreasing distance from the arbitrary point to the second edge E2.

More specifically, the first evanescent light generating portion 20e1 is not parallel to the medium facing surface 60 but is inclined at a large angle θ relative to the medium facing surface 60. Thus, in contrast to the aforementioned wall face of the surface of the concave portion of the second comparative example, the first evanescent light generating portion 20e1 allows total reflection of the laser light 50 propagating through the core 20, thereby allowing generation of the first evanescent light. Moreover, the first evanescent light generating portion 20e1 is not parallel to but inclined relative to the Y direction or the direction of travel of the laser light 50 propagating through the core 20. This allows a larger amount of the laser light 50 propagating through the core 20 to reach the first evanescent light generating portion 20e1. The present embodiment thus allows a larger amount of first evanescent light to be generated from the first evanescent light generating portion 20e1, thereby allowing a lot of first surface plasmons to be excited on the first plasmon exciting part 40e1.

Consequently, the present embodiment makes it possible to excite more surface plasmons on the plasmon generator 40 when compared with the near-field light generators of the first and second comparative examples.

In order for a larger amount of the laser light 50 propagating through the core 20 to reach the first evanescent light generating portion 20e1 in the present embodiment, the angle θ formed by the first evanescent light generating portion 20e1 relative to the Z direction (the first direction) is preferably somewhat smaller than 90°, more specifically, 80° or smaller. On the other hand, in order for the laser light 50 propagating through the core 20 to be totally reflected at the first evanescent light generating portion 20e1, the angle θ is preferably closer to 90°. The angle θ is equal to the incident angle of the laser light 50 with the first evanescent light generating portion 20e1. The angle θ thus needs to be equal to or greater than the critical angle for the laser light 50 to be incident on the first evanescent light generating portion 20e1. In view of the foregoing, the angle θ preferably falls within the range of 45° to 80°, and more preferably within the range of 70° to 80°.

In the present embodiment, since the first portion 401 of the plasmon generator 40 does not include the front end face 40a, the material for the first portion 401 can be selected from any metal materials that have high electrical conductivity suitable for excitation and propagation of surface plasmons, without the need for considering mechanical strength. This allows for appropriate excitation and propagation of surface plasmons on the first portion 401.

Further, in the present embodiment, the second portion 402 includes at least the first metal layer M1, the second metal layer M2 and the intermediate layer N1. The intermediate layer N1 is interposed between the first metal layer M1 and the second metal layer M2. The intermediate layer N1 is formed of a material that is higher in Vickers hardness than the metal material used to form the first metal layer M1 and the metal material used to form the second metal layer M2. This makes it possible to prevent the first metal layer M1 and the second metal layer M2 sandwiching the intermediate layer N1 from being deformed. Further, the present embodiment allows the second portion 402 as a whole to be higher in mechanical strength than in a case where the second portion consists only of a single metal layer formed of the metal layer material described previously. These features of the present embodiment make it possible to prevent the second portion 402 from being deformed or damaged, and the front end face 40a from being significantly recessed relative to the other parts of the medium facing surface 60 in the step of forming the medium facing surface 60 or due to a temperature change of the plasmon generator 40.

The above-described effects become more noticeable when the second portion 402 includes one or more pairs of an intermediate layer and a metal layer in addition to the first metal layer M1, the second metal layer M2 and the intermediate layer N1.

Consequently, the present embodiment makes it possible to provide a near-field light generator that allows for excitation of a lot of surface plasmons on the plasmon generator 40 and allows the plasmon generator 40 to operate with high reliability, and to provide a thermally-assisted magnetic recording head including such a near-field light generator.

Where the intermediate layer material is a metal material and the metal layer material is higher in electrical conductivity than the intermediate layer material, the intermediate layers N1 and N2 are preferably smaller in thickness than the metal layers M1 to M3. In such a case, it is possible to reduce loss of surface plasmons when the surface plasmons propagate from the end of the metal layer M1 located in the front end face 40a to the respective ends of the metal layers M2 and M3 located in the front end face 40a.

The surface plasmons need not necessarily propagate to the respective ends of the metal layer M3 and the intermediate layer N2 located in the front end face 40a. Even in such a case, the metal layer M3 and the intermediate layer N2 contribute to the enhancement of the mechanical strength of the plasmon generator 40 as a whole.

Further, the following effects are provided where a metal layer is sandwiched between two intermediate layers in the plasmon generator 40. A metal layer is typically formed of a metal polycrystal. In general, when a metal polycrystal gets hot, a plurality of crystal grains constituting the metal polycrystal aggregate and grow, and can thereby cause the metal polycrystal to be deformed. If a metal layer is sandwiched between two intermediate layers, the metal layer is restrained to some extent by the two intermediate layers. Thus, in such a case, it is possible to prevent the aggregation and growth of the plurality of crystal grains constituting the metal layer (the metal polycrystal) when the metal layer gets hot. This consequently allows for preventing the metal layer from becoming deformed.

Figure 15:
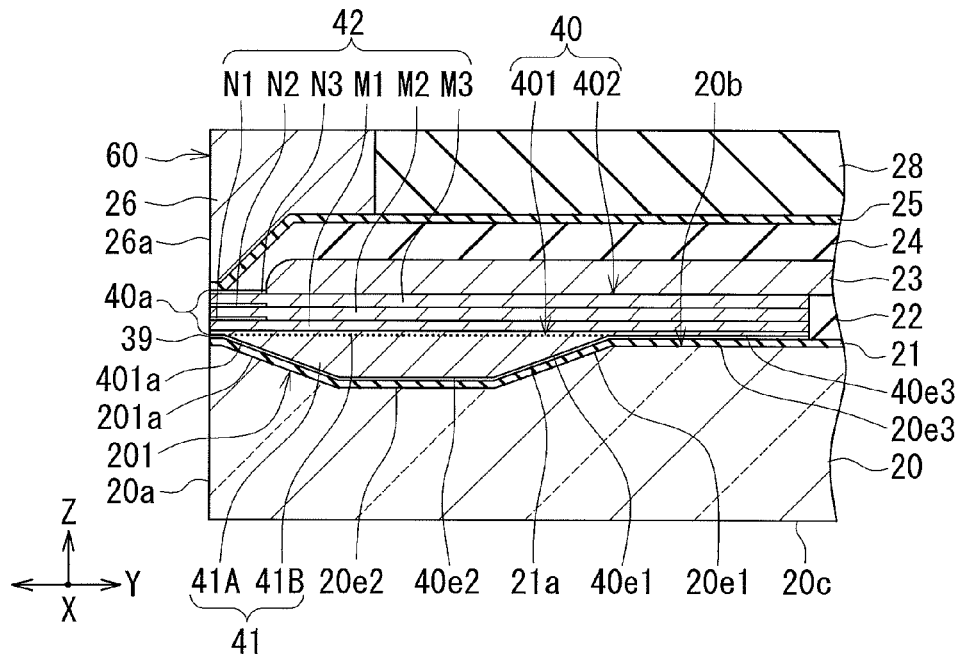
FIG. 15 is a cross-sectional view showing the main part of a first modification example of the thermally-assisted magnetic recording head according to the first embodiment of the invention.

First and second modification examples of the near-field light generator and the thermally-assisted magnetic recording head according to the present embodiment will now be described. First, reference is made to FIG. 15 to describe the first modification example. FIG. 15 is a cross-sectional view showing the main part of the first modification example of the thermally-assisted magnetic recording head according to the present embodiment. In the first modification example, the intermediate layers N1 and N2 and the protective layer N3 are located only in the vicinity of the medium facing surface 60. In the example shown in FIG. 15, the intermediate layers N1 and N2 and the protective layer N3 each have an end located in the front end face 40a, and are smaller than the metal layers M1 to M3 in length in the Y direction. The heat sink 23 is in contact with the top surface of the third metal layer M3. The first modification example allows for enhancing the mechanical strength of a part of the second portion 402 in the vicinity of the front end face 40a. In the first modification example also, the protective layer N3 enhances the adhesion of the dielectric layers 24 and 25 to the plasmon generator 40.

Figure 16:
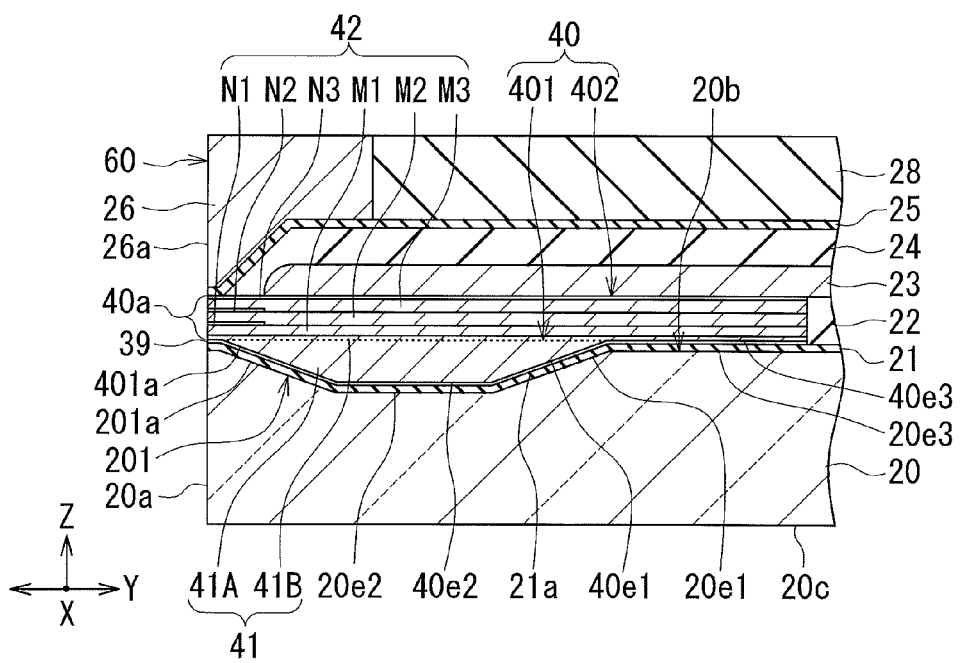
FIG. 16 is a cross-sectional view showing the main part of a second modification example of the thermally-assisted magnetic recording head according to the first embodiment of the invention.

The second modification example will now be described with reference to FIG. 16. FIG. 16 is a cross-sectional view showing the main part of the second modification example of the thermally-assisted magnetic recording head according to the present embodiment. In the second modification example, the intermediate layers N1 and N2 are located only in the vicinity of the medium facing surface 60 as in the first modification example. More specifically, the intermediate layers N1 and N2 each have an end located in the front end face 40a and are smaller than the metal layers M1 to M3 in length in the Y direction. On the other hand, the length of the protective layer N3 in the Y direction is the same as that of the metal layers M1 to M3.

Second Embodiment

Figure 17:
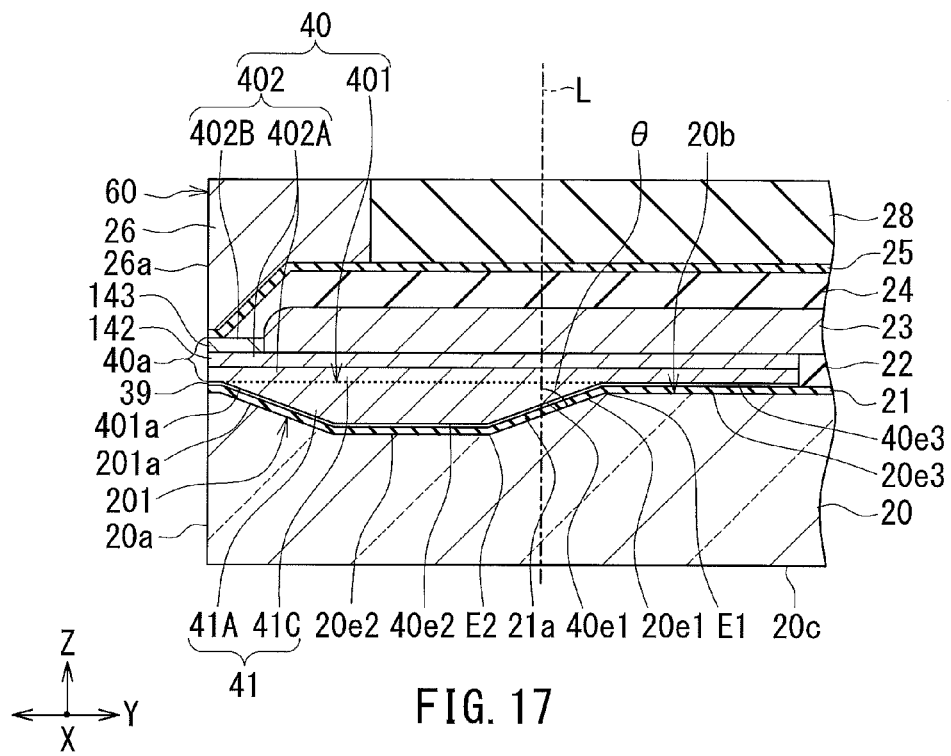
FIG. 17 is a cross-sectional view showing the main part of a thermally-assisted magnetic recording head according to a second embodiment of the invention.
Figure 18:
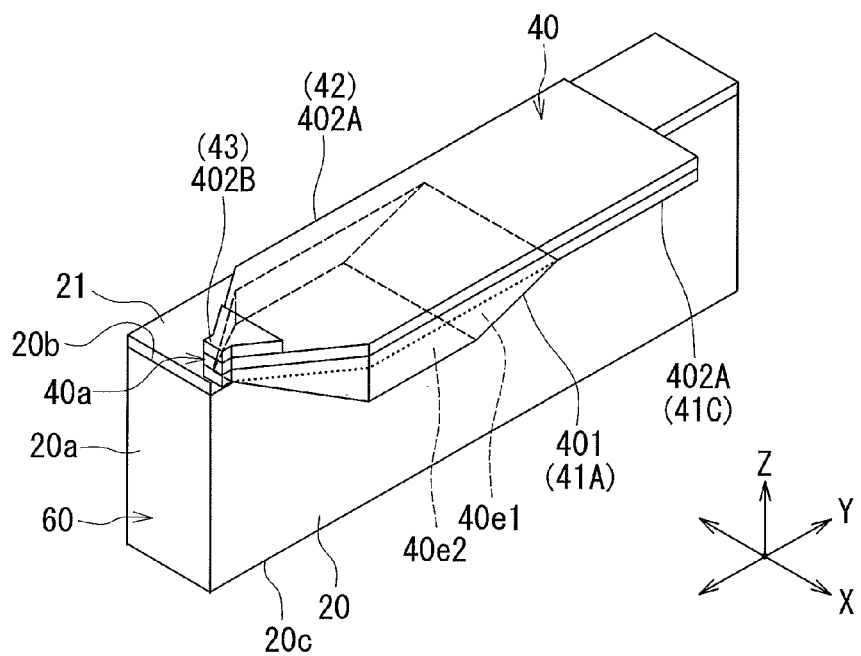
FIG. 18 is a perspective view showing a near-field light generator according to the second embodiment of the invention.

A near-field light generator and a thermally-assisted magnetic recording head according to a second embodiment of the invention will now be described. First, reference is made to FIG. 17 and FIG. 18 to describe the configuration of the thermally-assisted magnetic recording head according to the present embodiment. FIG. 17 is a cross-sectional view showing the main part of the thermally-assisted magnetic recording head according to the present embodiment. FIG. 18 is a perspective view showing the near-field light generator according to the present embodiment.

The near-field light generator and the thermally-assisted magnetic recording head according to the present embodiment differ from those according to the first embodiment in the following ways. In the present embodiment, as shown in FIG. 17, the first layer 41 of the plasmon generator 40 includes a plate-shaped portion 41C in place of the bonding portion 41B. The plate-shaped portion 41C has an end located in the front end face 40a and lies over the main portion 41A and the adhesion layer 39. The planar shape of the plate-shaped portion 41C is the same as that of the second portion 402 described in the first embodiment section. The plate-shaped portion 41C has a thickness in the range of 10 to 40 nm, for example.

The first layer 41 of the present embodiment may comprise a lower layer composed of the main portion 41A and the bonding portion 41B of the first embodiment and an upper layer corresponding to the first metal layer M1 of the first embodiment.

The plasmon generator 40 includes a second layer 142 and a third layer 143 in place of the multilayer film portion 42 of the first embodiment. The second layer 142 and the third layer 143 are stacked in this order on the plate-shaped portion 41C. The second layer 142 has an end located in the front end face 40a. The planar shape of the second layer 142 is the same as that of the second portion 402 described in the first embodiment section. The third layer 143 is located in the vicinity of the medium facing surface 60 and has an end located in the front end face 40a. The third layer 143 is smaller than the second layer 142 in length in the Y direction. The heat sink 23 is in contact with the top surface of the second layer 142.

In the present embodiment, the first portion 401 (the main portion 41A of the first layer 41) of the plasmon generator 40 is formed of a first metal material. The second portion 402 of the plasmon generator 40 includes a second metal material portion 402A formed of a second metal material, and a third metal material portion 402B formed of a third metal material. The second metal material portion 402A is located closer to the first portion 401 than is the third metal material portion 402B. The first and second metal materials are higher in electrical conductivity than the third metal material. The third metal material is higher in Vickers hardness than the first and second metal materials.

Each of the first and second metal materials can be one of Au, Ag, Al and Cu, for example. The third metal material can be one of Zr, ZrN, Ru, Pt, Pd, Ti, Ta, Ni, W, Cr, NiCr, NiFe, Co, Cu, TiW, TiN, Mo, Hf, and Rh, for example. When the first and second metal materials are Cu, the third metal material is other than Cu.

As far as the requirements that the first and second metal materials be higher in electrical conductivity than the third metal material and that the third metal material be higher in Vickers hardness than the first and second metal materials are satisfied, the first metal material and the second metal material may be the same or different from each other.

FIG. 17 shows an example in which the first metal material and the second metal material are the same and the second metal material portion 402A is partly integrated with the first portion 401. In this example, the second metal material portion 402A includes a lower layer integrated with the first portion 401 and an upper layer lying on the lower layer. The lower layer is formed of the plate-shaped portion 41C of the first layer 41. The upper layer is formed of the second layer 142. The third metal material portion 402B is formed of the third layer 143.

Each of the second and third metal material portions 402A and 402B has an end located in the front end face 40a of the plasmon generator 40. The end of the second metal material portion 402A is composed of the end of the plate-shaped portion 41C of the first layer 41 and the end of the second layer 142. The end of the third metal material portion 402B is formed of the end of the third layer 143.

A method of manufacturing the thermally-assisted magnetic recording head according to the present embodiment will now be described with reference to FIG. 19A through FIG. 21B. The following descriptions include the description of a method of manufacturing the near-field light generator according to the present embodiment. FIG. 19A through FIG. 21B each show a stack of layers formed in the process of manufacturing the thermally-assisted magnetic recording head. Note that portions located below the core 20 are omitted from FIG. 19A through FIG. 21B. FIGS. 19A-21A each show a cross section that intersects the end face 26a of the main pole 26 and that is perpendicular to the medium facing surface 60 and to the top surface 1a of the substrate 1. FIGS. 19B-21B each show a cross section of the stack taken at the position at which the medium facing surface 60 is to be formed. In FIGS. 19A-21A, the symbol "ABS" indicates the position at which the medium facing surface 60 is to be formed.

The method of manufacturing the thermally-assisted magnetic recording head according to the present embodiment is the same as the method according to the first embodiment up to the step of forming the metal film 41P which will later become the first layer 41 of the plasmon generator 40. FIG. 19A and FIG. 19B shows the stack after the metal film 41P has been formed.

FIG. 20A and FIG. 20B show the next step. In this step, first, the metal film 41P is polished by, for example, CMP, until the top surface of the metal film 41P reaches the level of the top surface of the first layer 41 (the top surface of the plate-shaped portion 41C) to be formed later. The first portion 401 of the plasmon generator 40 is thereby completed. In FIG. 20A the boundary between the first portion 401 and the remainder of the metal film 41P is indicated in a dotted line. Next, a second metal material film 142P of the second metal material is formed on the metal film 41P by sputtering, for example. A photoresist mask (not illustrated) is then formed on the second metal material film 142P. The photoresist mask has an opening shaped to correspond to the planar shape of the third layer 143 of the plasmon generator 40 to be formed later. With the photoresist mask left unremoved, a third metal material film 143P of the third metal material is then formed over the entire top surface of the stack. The photoresist mask is then lifted off.

FIG. 21A and FIG. 21B show the next step. In this step, first, an etching mask (not illustrated) is formed over the second and third metal material films 142P and 143P. The adhesion layer 39, the metal film 41P, the second metal material film 142P and the third metal material film 143P are then etched in part by, for example, RIE, using the etching mask. The remaining portions of the metal film 41P, the second metal material film 142P and the third metal material film 143P thereby become the first layer 41, the second layer 142 and the third layer 143, respectively, whereby the second portion 402 of the plasmon generator 40 is completed. In FIG. 21A the boundary between the first portion 401 and the second portion 402 is indicated in a dotted line. The subsequent steps are the same as those in the first embodiment.

The effects of the near-field light generator and the thermally-assisted magnetic recording head according to the present embodiment will now be described. In the present embodiment, the first portion 401 of the plasmon generator 40 is formed of the first metal material, and the second portion 402 of the plasmon generator 40 includes the second metal material portion 402A formed of the second metal material and the third metal material portion 402B formed of the third metal material. The first metal material used to form the first portion 401 is higher in electrical conductivity than the third metal material. Thus, selecting the first metal material from metal materials that have high electrical conductivity suitable for excitation and propagation of surface plasmons makes it possible to accomplish appropriate excitation and propagation of surface plasmons on the first portion 401.

The front end face 40a of the plasmon generator 40 is composed of the end of the second metal material portion 402A and the end of the third metal material portion 402B. The third metal material used to form the third metal material portion 402B is higher in Vickers hardness than the first and second metal materials. This makes it possible to prevent the front end face 40a from being significantly recessed relative to the other parts of the medium facing surface 60 in the step of forming the medium facing surface 60.

Further, the present embodiment makes it possible to prevent the third metal material portion 402B from being deformed or damaged, and the front end face 40a from being significantly recessed relative to the other parts of the medium facing surface 60 due to a temperature change of the plasmon generator 40.

The second metal material used to form the second metal material portion 402A is lower in Vickers hardness than the third metal material used to form the third metal material portion 402B. However, since the second metal material portion 402A is in contact with the third metal material portion 402B harder than the second metal material portion 402A, the second metal material portion 402A is protected by the third metal material portion 402B. This makes it possible to prevent deformation of the second metal material portion 402A.

Here, consider a case where the second portion 402 does not include the second metal material portion 402A. In such a case, the first portion 401 and the third metal material portion 402B formed of different materials are in contact with each other, and a difference in level develops between the side surface 401a of the first portion 401 and the end of the third metal material portion 402B. In this case, surface plasmons excited on the first portion 401 suffer a great loss as they propagate from the first portion 401 to the third metal material portion 402B, and it is thus difficult to allow the surface plasmons to efficiently propagate to the front end face 40a.

In contrast, in the present embodiment, the plasmon generator 40 includes the second metal material portion 402A. Like the first metal material, the second metal material used to form the second metal material portion 402A is higher in electrical conductivity than the third metal material. This allows the surface plasmons excited on the first portion 401 to efficiently propagate to the second metal material portion 402A.

The present embodiment cannot provide the effect resulting from the configuration of the first embodiment in which the second portion 402 of the plasmon generator 40 includes the first metal layer M1, the second metal layer M2 and the intermediate layer N1.

Figure 22:
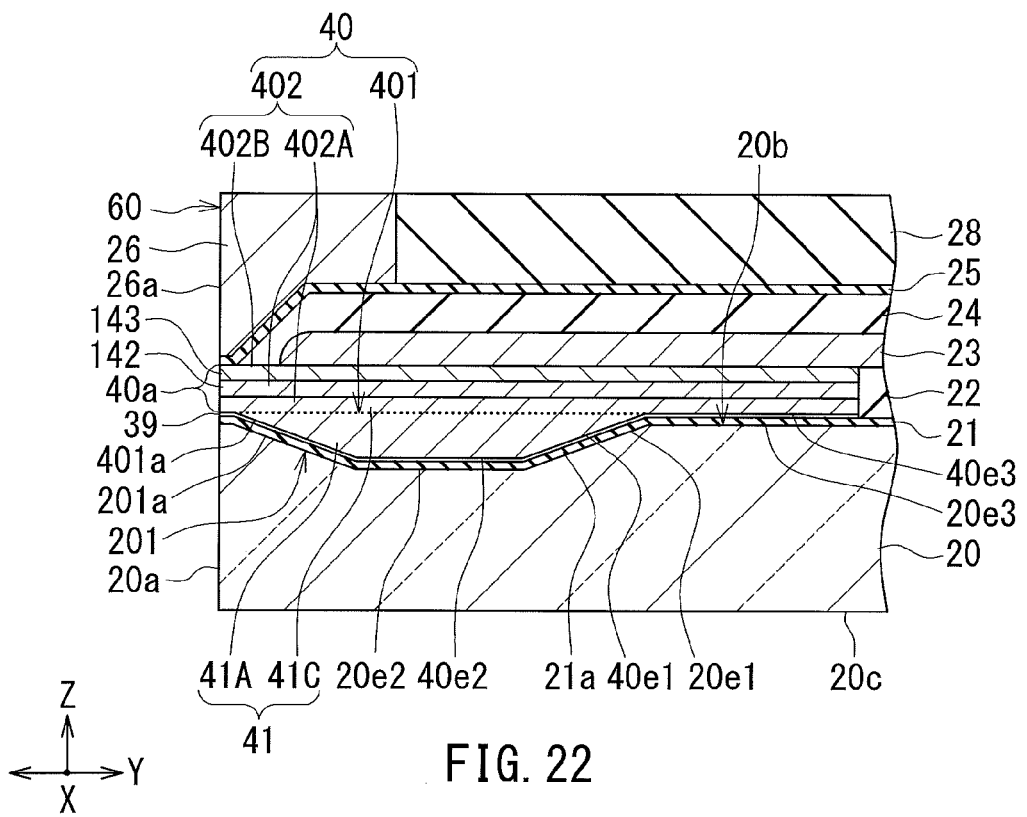
FIG. 22 is a cross-sectional view showing the main part of a modification example of the thermally-assisted magnetic recording head according to the second embodiment of the invention.

A modification example of the near-field light generator and the thermally-assisted magnetic recording head according to the present embodiment will now be described with reference to FIG. 22. FIG. 22 is a cross-sectional view showing the main part of the modification example of the thermally-assisted magnetic recording head according to the present embodiment. In the modification example, the planar shape of the third layer 143 of the plasmon generator 40 is the same as that of the second layer 142, that is, the same as that of the second portion 402 described in the first embodiment section. The heat sink 23 is in contact with the top surface of the third layer 143.

The remainder of configuration, function and effects of the present embodiment are similar to those of the first embodiment.

Third Embodiment

Figure 23:
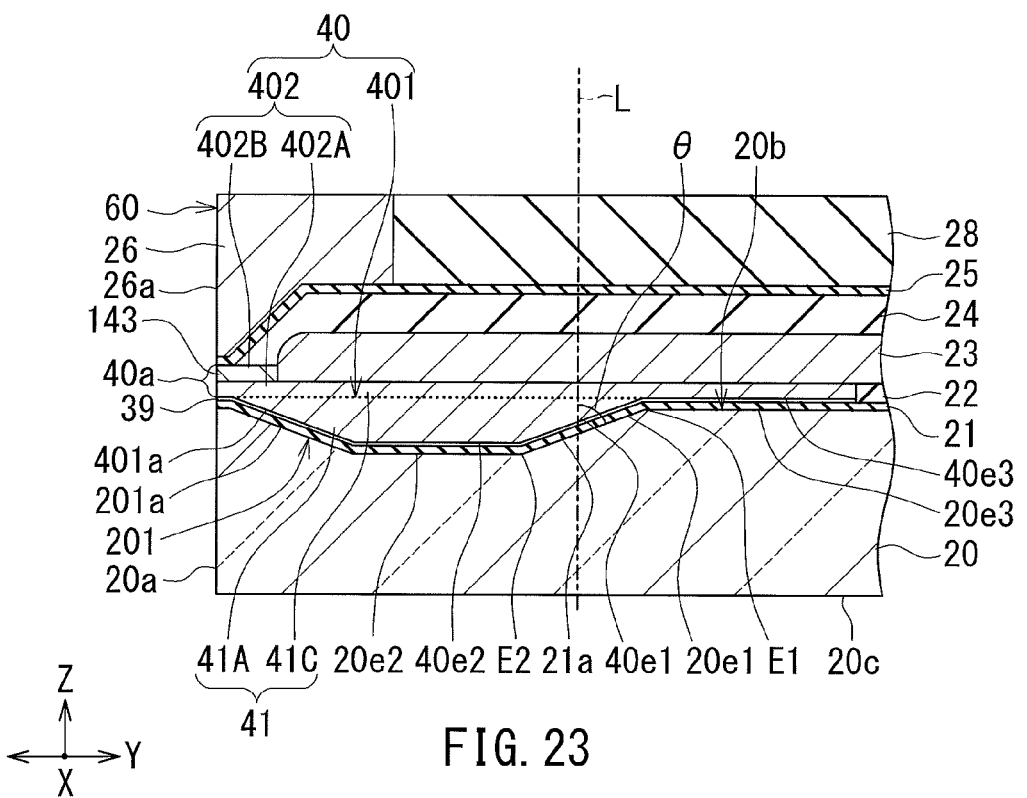
FIG. 23 is a cross-sectional view showing the main part of a thermally-assisted magnetic recording head according to a third embodiment of the invention.
Figure 24:
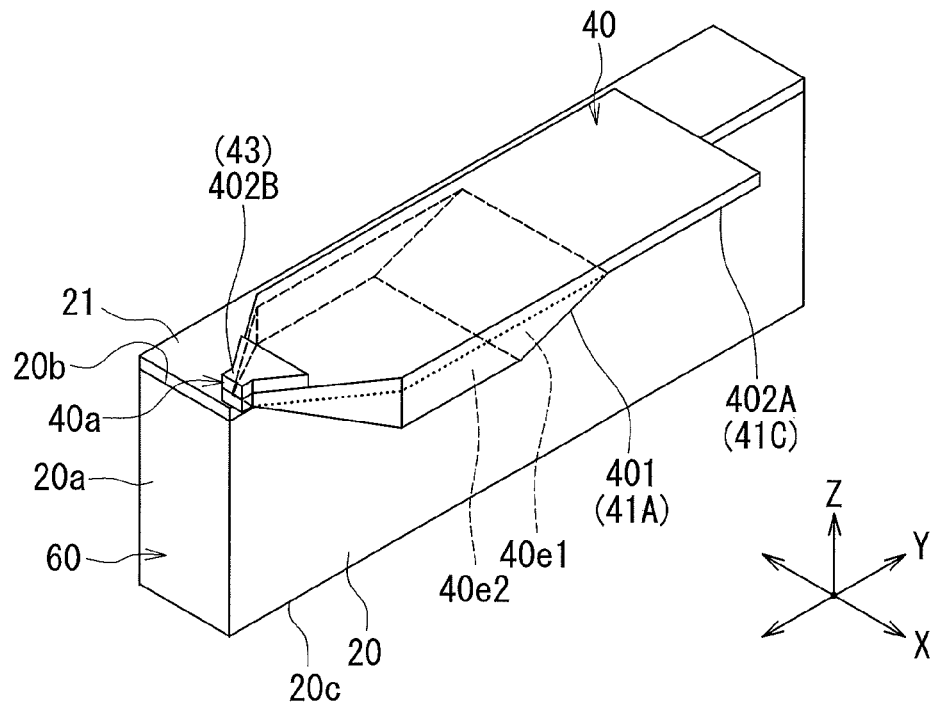
FIG. 24 is a perspective view showing a near-field light generator according to the third embodiment of the invention.

A near-field light generator and a thermally-assisted magnetic recording head according to a third embodiment of the invention will now be described. First, reference is made to FIG. 23 and FIG. 24 to describe the configuration of the thermally-assisted magnetic recording head according to the present embodiment. FIG. 23 is a cross-sectional view showing the main part of the thermally-assisted magnetic recording head according to the present embodiment. FIG. 24 is a perspective view showing the near-field light generator according to the present embodiment.

The near-field light generator and the thermally-assisted magnetic recording head according to the present embodiment differ from those according to the second embodiment in the following ways. In the present embodiment, the plasmon generator 40 does not include the second layer 142. The third layer 143 lies on the plate-shaped portion 41C of the first layer 41. The heat sink 23 is in contact with the top surface of the plate-shaped portion 41C. Further, in the present embodiment the second portion 402 of the plasmon generator 40 consists only of the plate-shaped portion 41C of the first layer 41.

Figure 25:
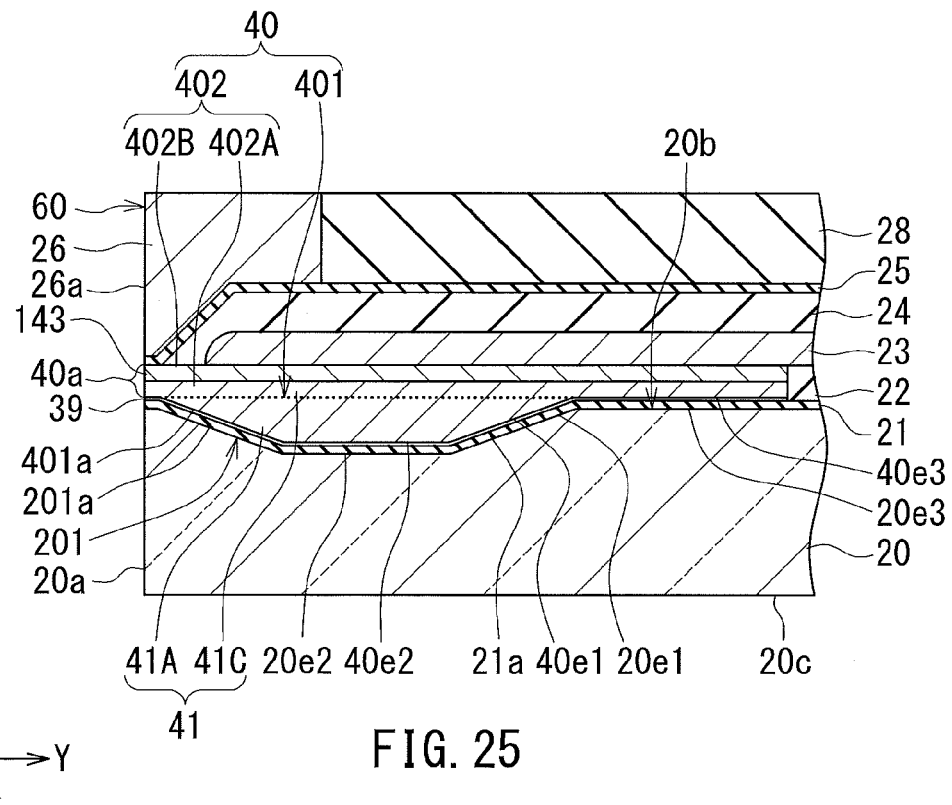
FIG. 25 is a cross-sectional view showing the main part of a modification example of the thermally-assisted magnetic recording head according to the third embodiment of the invention.

A modification example of the near-field light generator and the thermally-assisted magnetic recording head according to the present embodiment will now be described with reference to FIG. 25. FIG. 25 is a cross-sectional view showing the main part of the modification example of the thermally-assisted magnetic recording head according to the present embodiment. In the modification example, the planar shape of the third layer 143 of the plasmon generator 40 is the same as that of the second portion 402 described in the first embodiment section. The heat sink 23 is in contact with the top surface of the third layer 143.

The remainder of configuration, function and effects of the present embodiment are similar to those of the second embodiment.

The present invention is not limited to the foregoing embodiments, and various modifications may be made thereto. For example, as far as the requirements of the appended claims are met, the shape of the plasmon generator 40 and the locations of the plasmon generator 40, the core 20 and the main pole 26 are not limited to the respective examples illustrated in the foregoing embodiments but can be chosen as desired. For example, the plasmon generator 40 may be formed by stacking the second portion 402 and the first portion 401 in this order from the bottom, and the core 20 may be disposed above the first portion 401. In such a case, the bottom surface 20c of the core 20 corresponds to the "first surface" of the present invention, and the core 20 has a concave portion recessed from the bottom surface 20c with at least part of the first portion 401 received in the concave portion.

Further, in the second embodiment, the first layer 41 of the plasmon generator 40 need not necessarily include the plate-shaped portion 41C. In such a case, the first metal material used to form the first portion 401 of the plasmon generator 40 and the second metal material used to form the second metal material portion 401A of the second portion 402 of the plasmon generator 40 may be different from each other.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A near-field light generator comprising:
a waveguide including a core through which light propagates, and a cladding provided around the core; and
a plasmon generator having a front end face, wherein
the plasmon generator includes a first portion and a second portion that are adjacent in a first direction orthogonal to a direction of travel of the light propagating through the core, the second portion including the front end face,
the core has a first surface intersecting the first direction, and a concave portion recessed from the first surface,
at least part of the first portion of the plasmon generator is received in the concave portion,
the concave portion has a surface contiguous with the first surface, the surface of the concave portion including a first evanescent light generating portion,
the first evanescent light generating portion generates first evanescent light based on the light propagating through the core, the first evanescent light generating portion being located farther from a virtual plane than is the first portion of the plasmon generator, the virtual plane including the front end face of the plasmon generator, the first evanescent light generating portion having a first edge closest to the first surface and a second edge farthest from the first surface, wherein:
a distance from the virtual plane to an arbitrary point on the first evanescent light generating portion decreases with decreasing distance from the arbitrary point to the second edge, and
the first evanescent light generating portion forms an angle in the range of 55° to 80° relative to the first direction,
the first portion of the plasmon generator includes a first plasmon exciting portion opposed to the first evanescent light generating portion, a first surface plasmon being excited on the first plasmon exciting portion through coupling with the first evanescent light, and
the front end face of the plasmon generator generates near-field light based on the first surface plasmon.

2. The near-field light generator according to claim 1, wherein
the surface of the concave portion of the core further includes a second evanescent light generating portion that is located closer to the virtual plane than is the first evanescent light generating portion and contiguous with the first evanescent light generating portion, the first portion of the plasmon generator further includes a second plasmon exciting portion opposed to the second evanescent light generating portion, the second evanescent light generating portion and the second plasmon exciting portion are adjacent in the first direction, the second evanescent light generating portion generates second evanescent light based on the light propagating through the core, a second surface plasmon is excited on the second plasmon exciting portion through coupling with the second evanescent light, and the front end face of the plasmon generator generates near-field light based on the first and second surface plasmons.

3. The near-field light generator according to claim 2, wherein the first surface of the core includes a third evanescent light generating portion that is located farther from the virtual plane than is the first evanescent light generating portion and contiguous with the first evanescent light generating portion, the second portion of the plasmon generator includes a third plasmon exciting portion opposed to the third evanescent light generating portion, the third evanescent light generating portion generates third evanescent light based on the light propagating through the core, a third surface plasmon is excited on the third plasmon exciting portion through coupling with the third evanescent light, and the front end face of the plasmon generator generates near-field light based on the first to third surface plasmons.

4. The near-field light generator according to claim 1, wherein the second portion of the plasmon generator includes a first metal layer, a second metal layer, and an intermediate layer, the intermediate layer is interposed between the first metal layer and the second metal layer, each of the first metal layer, the second metal layer and the intermediate layer has an end located in the front end face, each of the first and second metal layers is formed of a metal material, and the intermediate layer is formed of a material that is higher in Vickers hardness than the metal material used to form the first metal layer and the metal material used to form the second metal layer.

5. The near-field light generator according to claim 1, wherein the first portion of the plasmon generator is formed of a first metal material, the second portion of the plasmon generator includes a second metal material portion formed of a second metal material, and a third metal material portion formed of a third metal material, the second metal material portion is located closer to the first portion than is the third metal material portion, the first and second metal materials are higher in electrical conductivity than the third metal material, and the third metal material is higher in Vickers hardness than the first and second metal materials.

6. A method of manufacturing the near-field light generator of claim 1, comprising the steps of:

forming the core;
forming the cladding; and
forming the plasmon generator, wherein
the step of forming the core includes the steps of:
　forming an initial core having a top surface; and
　forming the concave portion in the initial core by etching a portion of the top surface of the initial core,
the initial core becomes the core when the concave portion is formed,
in the step of forming the concave portion, a remaining unetched portion of the top surface of the initial core becomes the first surface of the core, and
in the step of forming the plasmon generator, the plasmon generator is formed such that at least part of the first portion is received in the concave portion.

7. The method of manufacturing the near-field light generator according to claim 6, wherein the second portion of the plasmon generator includes a first metal layer, a second metal layer, and an intermediate layer, the intermediate layer is interposed between the first metal layer and the second metal layer, each of the first metal layer, the second metal layer and the intermediate layer has an end located in the front end face, each of the first and second metal layers is formed of a metal material, the intermediate layer is formed of a material that is higher in Vickers hardness than the metal material used to form the first metal layer and the metal material used to form the second metal layer, and the step of forming the plasmon generator includes the steps of:
　forming the first portion; and
　forming the second portion after the step of forming the first portion.

8. The method of manufacturing the near-field light generator according to claim 6, wherein the first portion of the plasmon generator is formed of a first metal material;

the second portion of the plasmon generator includes a second metal material portion formed of a second metal material, and a third metal material portion formed of a third metal material, the second metal material portion is located closer to the first portion than is the third metal material portion, the first and second metal materials are higher in electrical conductivity than the third metal material, the third metal material is higher in Vickers hardness than the first and second metal materials, and the step of forming the plasmon generator includes the steps of:
　forming the first portion; and
　forming the second portion after the step of forming the first portion.

9. A thermally-assisted magnetic recording head comprising:

a medium facing surface facing a recording medium;
a main pole producing a write magnetic field for writing data on the recording medium; and
a near-field light generator, wherein
the near-field light generator includes:
　a waveguide including a core through which light propagates, and a cladding provided around the core; and
　a plasmon generator having a front end face located in the medium facing surface, the plasmon generator includes a first portion and a second portion that are adjacent in a first direction orthogonal to a direction of travel of the light propagating through the core, the second portion including the front end face, the core has a first surface intersecting the first direction, and a concave portion recessed from the first surface, at least part of the first portion of the plasmon generator is received in the concave portion, the concave portion has a surface contiguous with the first surface, the surface of the concave portion including a first evanescent light generating portion, the first evanescent light generating portion generates first evanescent light based on the light propagating through the core, the first evanescent light generating portion being located farther from the medium facing surface than is the first portion of the plasmon generator, the first evanescent light generating portion having a first edge closest to the first surface and a second edge farthest from the first surface, wherein:

a distance from the medium facing surface to an arbitrary point on the first evanescent light generating portion decreases with decreasing distance from the arbitrary point to the second edge, and the first evanescent light generating portion forms an angle in the range of 55° to 80° relative to the first direction, the first portion of the plasmon generator includes a first plasmon exciting portion opposed to the first evanescent light generating portion, a first surface plasmon being excited on the first plasmon exciting portion through coupling with the first evanescent light, and the front end face of the plasmon generator generates near-field light based on the first surface plasmon.

10. The thermally-assisted magnetic recording head according to claim 9, wherein the surface of the concave portion of the core further includes a second evanescent light generating portion that is located closer to the medium facing surface than is the first evanescent light generating portion and contiguous with the first evanescent light generating portion, the first portion of the plasmon generator further includes a second plasmon exciting portion opposed to the second evanescent light generating portion, the second evanescent light generating portion and the second plasmon exciting portion are adjacent in the first direction, the second evanescent light generating portion generates second evanescent light based on the light propagating through the core, a second surface plasmon is excited on the second plasmon exciting portion through coupling with the second evanescent light, and the front end face of the plasmon generator generates near-field light based on the first and second surface plasmons.

11. The thermally-assisted magnetic recording head according to claim 10, wherein the first surface of the core includes a third evanescent light generating portion that is located farther from the medium facing surface than is the first evanescent light generating portion and contiguous with the first evanescent light generating portion, the second portion of the plasmon generator includes a third plasmon exciting portion opposed to the third evanescent light generating portion, the third evanescent light generating portion generates third evanescent light based on the light propagating through the core, a third surface plasmon is excited on the third plasmon exciting portion through coupling with the third evanescent light, and the front end face of the plasmon generator generates near-field light based on the first to third surface plasmons.

12. The thermally-assisted magnetic recording head according to claim 9, wherein the second portion of the plasmon generator includes a first metal layer, a second metal layer, and an intermediate layer, the intermediate layer is interposed between the first metal layer and the second metal layer, each of the first metal layer, the second metal layer and the intermediate layer has an end located in the front end face, each of the first and second metal layers is formed of a metal material, and the intermediate layer is formed of a material that is higher in Vickers hardness than the metal material used to form the first metal layer and the metal material used to form the second metal layer.

13. The thermally-assisted magnetic recording head according to claim 9, wherein the first portion of the plasmon generator is formed of a first metal material, the second portion of the plasmon generator includes a second metal material portion formed of a second metal material, and a third metal material portion formed of a third metal material, the second metal material portion is located closer to the first portion than is the third metal material portion, the first and second metal materials are higher in electrical conductivity than the third metal material, and the third metal material is higher in Vickers hardness than the first and second metal materials.

14. A near-field light generator comprising:

a waveguide including a core through which light propagates, and a cladding provided around the core; and a plasmon generator having a front end face, wherein the plasmon generator includes a first portion and a second portion that are adjacent in a first direction orthogonal to a direction of travel of the light propagating through the core, the second portion including the front end face, the core has a first surface intersecting the first direction, and a concave portion recessed from the first surface, at least part of the first portion of the plasmon generator is received in the concave portion, the concave portion has a surface contiguous with the first surface, the surface of the concave portion including i) a first evanescent light generating portion that generates first evanescent light based on the light propagating through the core and ii) a second evanescent light generating portion that generates second evanescent light based on the light propagating through the core, wherein:

the first evanescent light generating portion is located farther from a virtual plane than is the first portion of the plasmon generator, the virtual plane including the front end face of the plasmon generator, the first evanescent light generating portion having a first edge closest to the first surface and a second edge farthest from the first surface, the second evanescent light generating portion is located closer to the virtual plane than is the first evanescent light generating portion and contiguous with the first evanescent light generating portion, and
a distance from the virtual plane to an arbitrary point on the first evanescent light generating portion decreases with decreasing distance from the arbitrary point to the second edge,
the first portion of the plasmon generator includes (i) a first plasmon exciting portion opposed to the first evanescent light generating portion and (ii) a second plasmon exciting portion opposed to the second evanescent light generating portion, a first surface plasmon being excited on the first plasmon exciting portion through coupling with the first evanescent light, a second surface plasmon being excited on the second plasmon exciting portion through coupling with the second evanescent light, the second evanescent light generating portion and the second plasmon exciting portion being adjacent in the first direction,
the first surface of the core includes a third evanescent light generating portion that generates third evanescent light based on the light propagating through the core, the third evanescent light generating portion being located farther from the virtual plane than is the first evanescent light generating portion and contiguous with the first evanescent light generating portion,
the second portion of the plasmon generator includes a third plasmon exciting portion opposed to the third evanescent light generating portion, a third surface plasmon being excited on the third plasmon exciting portion through coupling with the third evanescent light, and
the front end face of the plasmon generator generates near-field light based on the first to third surface plasmons.

15. A thermally-assisted magnetic recording head comprising:
a medium facing surface facing a recording medium;
a main pole producing a write magnetic field for writing data on the recording medium; and
a near-field light generator, wherein
the near-field light generator includes:
a waveguide including a core through which light propagates, and a cladding provided around the core; and
a plasmon generator having a front end face located in the medium facing surface,
the plasmon generator includes a first portion and a second portion that are adjacent in a first direction orthogonal to a direction of travel of the light propagating through the core, the second portion including the front end face,
the core has a first surface intersecting the first direction, and a concave portion recessed from the first surface,
at least part of the first portion of the plasmon generator is received in the concave portion,
the concave portion has a surface contiguous with the first surface, the surface of the concave portion including i) a first evanescent light generating portion that generates first evanescent light based on the light propagating through the core and ii) a second evanescent light generating portion that generates second evanescent light based on the light propagating through the core, wherein:
the first evanescent light generating portion is located farther from the medium facing surface than is the first portion of the plasmon generator, the first evanescent light generating portion having a first edge closest to the first surface and a second edge farthest from the first surface,
the second evanescent light generating portion is located closer to the medium facing surface than is the first evanescent light generating portion and contiguous with the first evanescent light generating portion, and
a distance from the medium facing surface to an arbitrary point on the first evanescent light generating portion decreases with decreasing distance from the arbitrary point to the second edge,
the first portion of the plasmon generator includes (i) a first plasmon exciting portion opposed to the first evanescent light generating portion and (ii) a second plasmon exciting portion opposed to the second evanescent light generating portion, a first surface plasmon being excited on the first plasmon exciting portion through coupling with the first evanescent light, a second surface plasmon being excited on the second plasmon exciting portion through coupling with the second evanescent light, the second evanescent light generating portion and the second plasmon exciting portion being adjacent in the first direction,
the first surface of the core includes a third evanescent light generating portion that generates third evanescent light based on the light propagating through the core, the third evanescent light generating portion being located farther from the medium facing surface than is the first evanescent light generating portion and contiguous with the first evanescent light generating portion,
the second portion of the plasmon generator includes a third plasmon exciting portion opposed to the third evanescent light generating portion, a third surface plasmon being excited on the third plasmon exciting portion through coupling with the third evanescent light, and
the front end face of the plasmon generator generates near-field light based on the first to third surface plasmons.

16. A near-field light generator comprising:
a waveguide including a core through which light propagates, and a cladding provided around the core; and
a plasmon generator having a front end face, wherein
the plasmon generator includes a first portion and a second portion that are adjacent in a first direction orthogonal to a direction of travel of the light propagating through the core, the second portion including the front end face,
the core has a first surface intersecting the first direction, and a concave portion recessed from the first surface,
at least part of the first portion of the plasmon generator is received in the concave portion,
the concave portion has a surface contiguous with the first surface, the surface of the concave portion including a first evanescent light generating portion,
the first evanescent light generating portion generates first evanescent light based on the light propagating through the core, the first evanescent light generating portion being located farther from a virtual plane than is the first portion of the plasmon generator, the virtual plane including the front end face of the plasmon generator, the first evanescent light generating portion having a first edge closest to the first surface and a second edge farthest from the first surface, a distance from the virtual plane to an arbitrary point on the first evanescent light generating portion decreasing with decreasing distance from the arbitrary point to the second edge,
the first portion of the plasmon generator includes a first plasmon exciting portion opposed to the first evanescent light generating portion, a first surface plasmon being excited on the first plasmon exciting portion through coupling with the first evanescent light,
the front end face of the plasmon generator generates near-field light based on the first surface plasmon, and the second portion of the plasmon generator includes i) a first metal layer, ii) a second metal layer, and iii) an intermediate layer, the intermediate layer being interposed between the first metal layer and the second metal layer, wherein:
  each of the first metal layer, the second metal layer and the intermediate layer has an end located in the front end face,
  each of the first and second metal layers is formed of a metal material, and
  the intermediate layer is formed of a material that is higher in Vickers hardness than the metal material used to form the first metal layer and the metal material used to form the second metal layer.

17. A near-field light generator comprising:
a waveguide including a core through which light propagates, and a cladding provided around the core; and
a plasmon generator having a front end face, wherein
the plasmon generator includes a first portion and a second portion that are adjacent in a first direction orthogonal to a direction of travel of the light propagating through the core, the second portion including the front end face,
the core has a first surface intersecting the first direction, and a concave portion recessed from the first surface,
at least part of the first portion of the plasmon generator is received in the concave portion,
the concave portion has a surface contiguous with the first surface, the surface of the concave portion including a first evanescent light generating portion,
the first evanescent light generating portion generates first evanescent light based on the light propagating through the core, the first evanescent light generating portion being located farther from a virtual plane than is the first portion of the plasmon generator, the virtual plane including the front end face of the plasmon generator, the first evanescent light generating portion having a first edge closest to the first surface and a second edge farthest from the first surface, a distance from the virtual plane to an arbitrary point on the first evanescent light generating portion decreasing with decreasing distance from the arbitrary point to the second edge,
the first portion of the plasmon generator includes a first plasmon exciting portion opposed to the first evanescent light generating portion, a first surface plasmon being excited on the first plasmon exciting portion through coupling with the first evanescent light,
the front end face of the plasmon generator generates near-field light based on the first surface plasmon, and
the first portion of the plasmon generator is formed of a first metal material,
the second portion of the plasmon generator includes i) a second metal material portion formed of a second metal material and ii) a third metal material portion formed of a third metal material, the second metal material portion being located closer to the first portion than is the third metal material portion, wherein:
  the first and second metal materials are higher in electrical conductivity than the third metal material, and
  the third metal material is higher in Vickers hardness than the first and second metal materials.

18. A thermally-assisted magnetic recording head comprising:
a medium facing surface facing a recording medium;
a main pole producing a write magnetic field for writing data on the recording medium; and
a near-field light generator, wherein
the near-field light generator includes:
  a waveguide including a core through which light propagates, and a cladding provided around the core; and
  a plasmon generator having a front end face located in the medium facing surface,
the plasmon generator includes a first portion and a second portion that are adjacent in a first direction orthogonal to a direction of travel of the light propagating through the core, the second portion including the front end face,
the core has a first surface intersecting the first direction, and a concave portion recessed from the first surface,
at least part of the first portion of the plasmon generator is received in the concave portion,
the concave portion has a surface contiguous with the first surface, the surface of the concave portion including a first evanescent light generating portion,
the first evanescent light generating portion generates first evanescent light based on the light propagating through the core, the first evanescent light generating portion being located farther from the medium facing surface than is the first portion of the plasmon generator, the first evanescent light generating portion having a first edge closest to the first surface and a second edge farthest from the first surface, a distance from the medium facing surface to an arbitrary point on the first evanescent light generating portion decreasing with decreasing distance from the arbitrary point to the second edge,
the first portion of the plasmon generator includes a first plasmon exciting portion opposed to the first evanescent light generating portion, a first surface plasmon being excited on the first plasmon exciting portion through coupling with the first evanescent light,
the front end face of the plasmon generator generates near-field light based on the first surface plasmon, and
the second portion of the plasmon generator includes i) a first metal layer, ii) a second metal layer, and iii) an intermediate layer, the intermediate layer being interposed between the first metal layer and the second metal layer, wherein:
  each of the first metal layer, the second metal layer and the intermediate layer has an end located in the front end face,
  each of the first and second metal layers is formed of a metal material, and
  the intermediate layer is formed of a material that is higher in Vickers hardness than the metal material used to form the first metal layer and the metal material used to form the second metal layer.

19. A thermally-assisted magnetic recording head comprising:
a medium facing surface facing a recording medium;
a main pole producing a write magnetic field for writing data on the recording medium; and
a near-field light generator, wherein
the near-field light generator includes:
  a waveguide including a core through which light propagates, and a cladding provided around the core; and
  a plasmon generator having a front end face located in the medium facing surface,
the plasmon generator includes a first portion and a second portion that are adjacent in a first direction orthogonal to a direction of travel of the light propagating through the core, the second portion including the front end face,
the core has a first surface intersecting the first direction, and a concave portion recessed from the first surface,
at least part of the first portion of the plasmon generator is received in the concave portion, the concave portion has a surface contiguous with the first surface, the surface of the concave portion including a first evanescent light generating portion, the first evanescent light generating portion generates first evanescent light based on the light propagating through the core, the first evanescent light generating portion being located farther from the medium facing surface than is the first portion of the plasmon generator, the first evanescent light generating portion having a first edge closest to the first surface and a second edge farthest from the first surface, a distance from the medium facing surface to an arbitrary point on the first evanescent light generating portion decreasing with decreasing distance from the arbitrary point to the second edge, the first portion of the plasmon generator includes a first plasmon exciting portion opposed to the first evanescent light generating portion, a first surface plasmon being excited on the first plasmon exciting portion through coupling with the first evanescent light, the front end face of the plasmon generator generates near-field light based on the first surface plasmon, and the first portion of the plasmon generator is formed of a first metal material, the second portion of the plasmon generator includes i) a second metal material portion formed of a second metal material and ii) a third metal material portion formed of a third metal material, the second metal material portion being located closer to the first portion than is the third metal material portion, wherein:

the first and second metal materials are higher in electrical conductivity than the third metal material, and the third metal material is higher in Vickers hardness than the first and second metal materials.

* * * * *